July 12, 1960
G. A. FRANCIS ET AL
2,944,333
ASSEMBLY APPARATUS
Filed Dec. 23, 1955
8 Sheets-Sheet 1
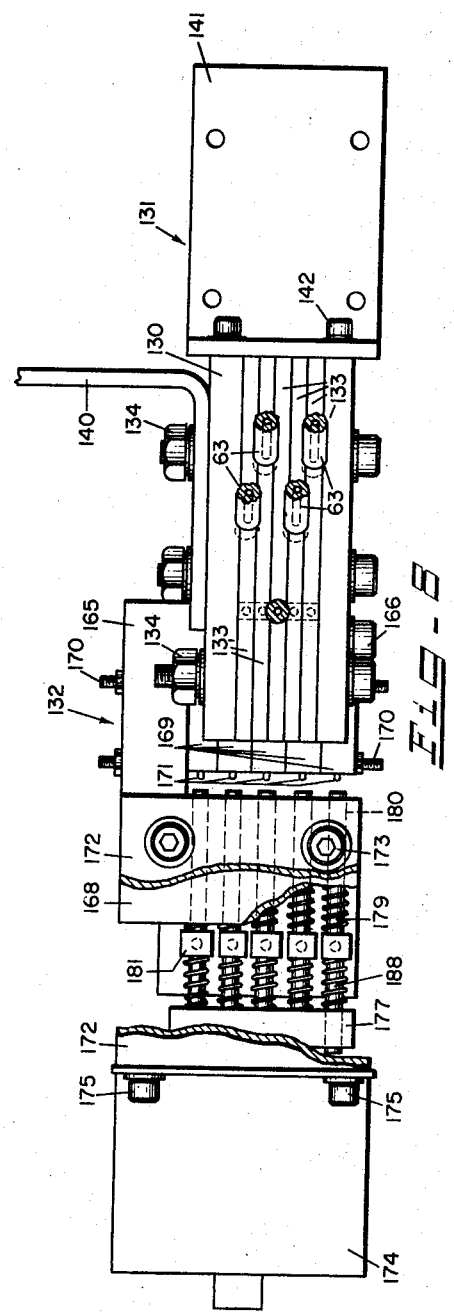
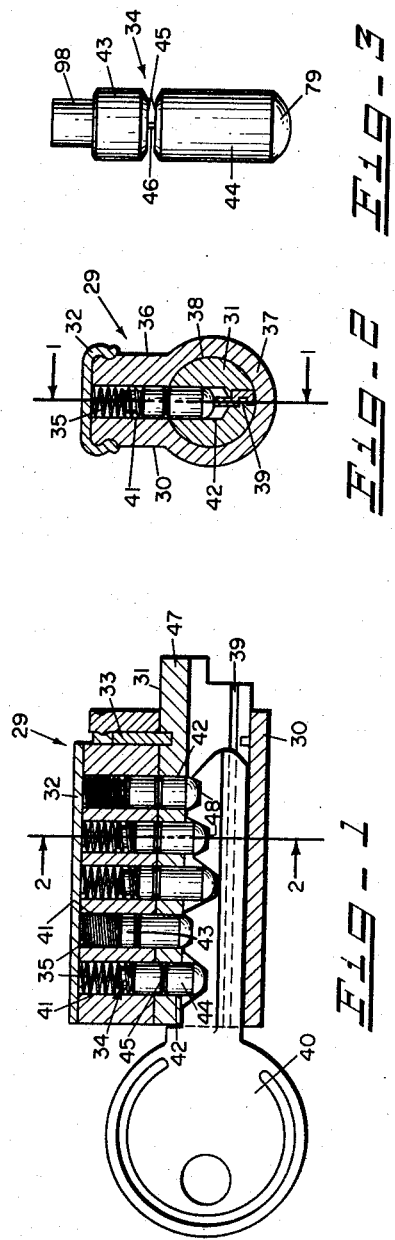
INVENTOR.
Gerald A. Francis
Howard C. Davis
Charles E. Smith
BY
ATTORNEYS.

July 12, 1960

G. A. FRANCIS ET AL 2,944,333

ASSEMBLY APPARATUS

Filed Dec. 23, 1955

INVENTOR.
Gerald A. Francis
Howard C. Davis
Charles E. Smith

BY Gray, Mase & Dunson

ATTORNEYS

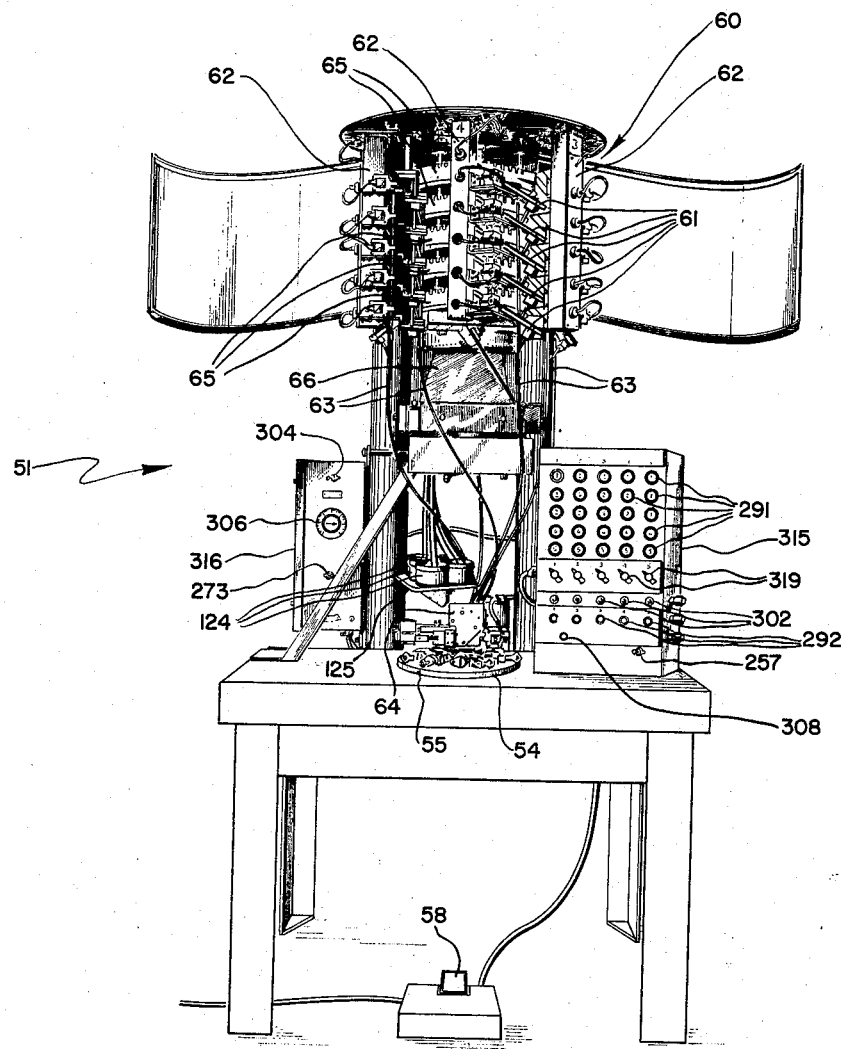

July 12, 1960

G. A. FRANCIS ET AL 2,944,333

ASSEMBLY APPARATUS

Filed Dec. 23, 1955

INVENTOR.
Gerald A. Francis
Howard C. Davis
Charles E. Smith

BY Gray, Mase & Dunson

ATTORNEYS

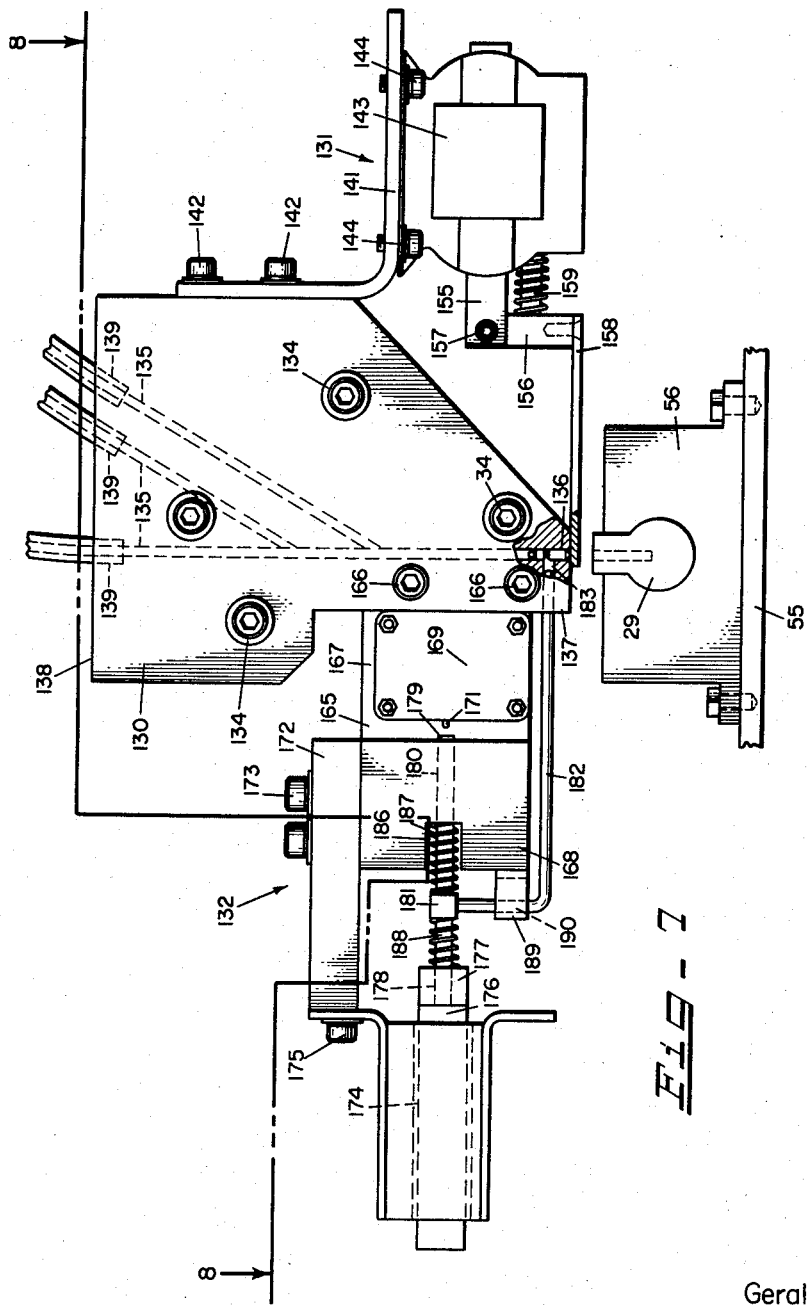

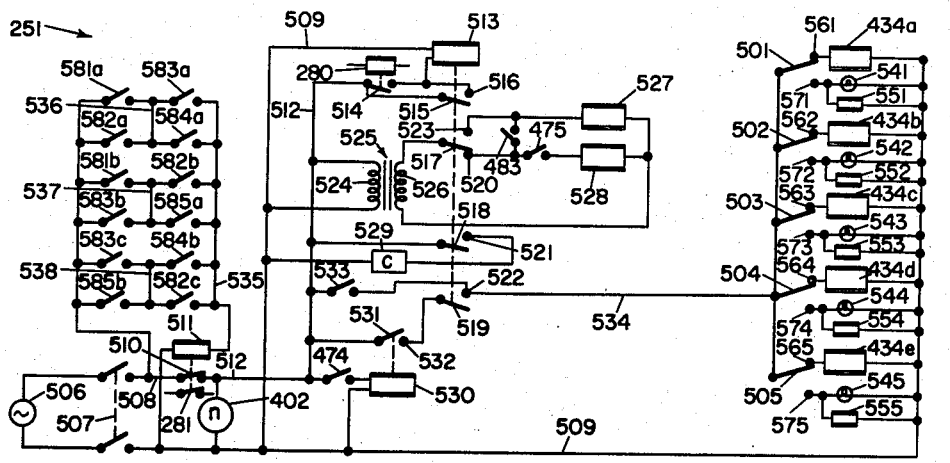
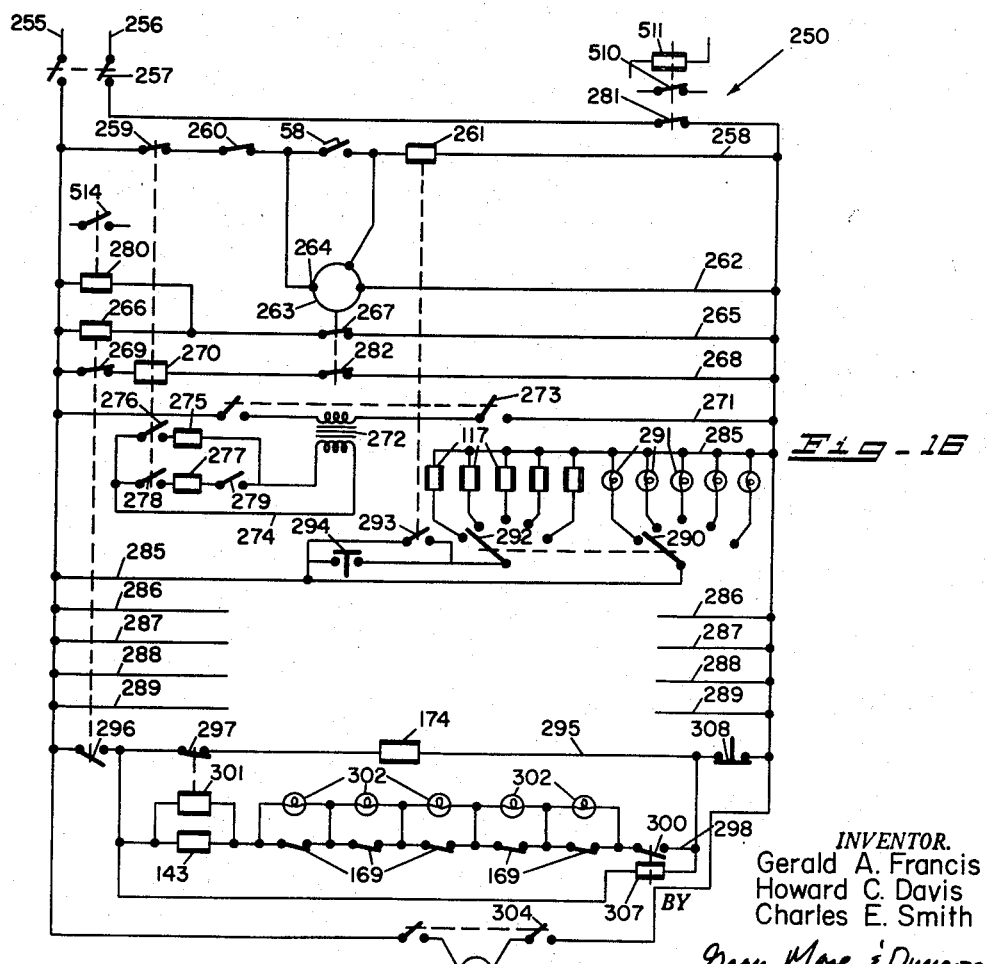

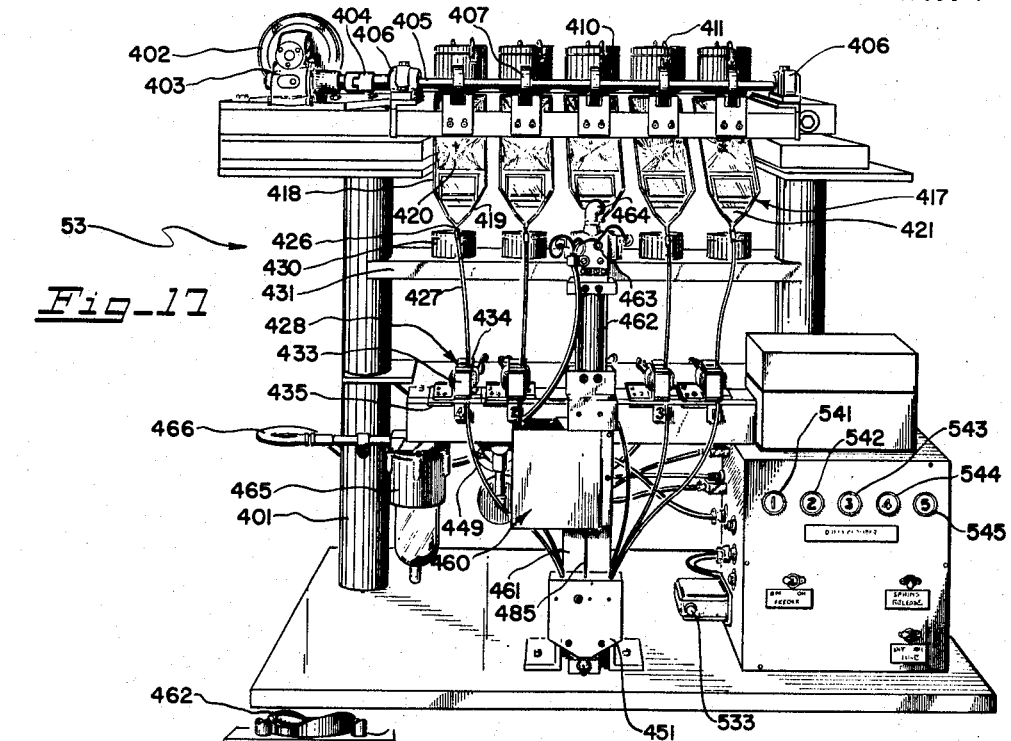

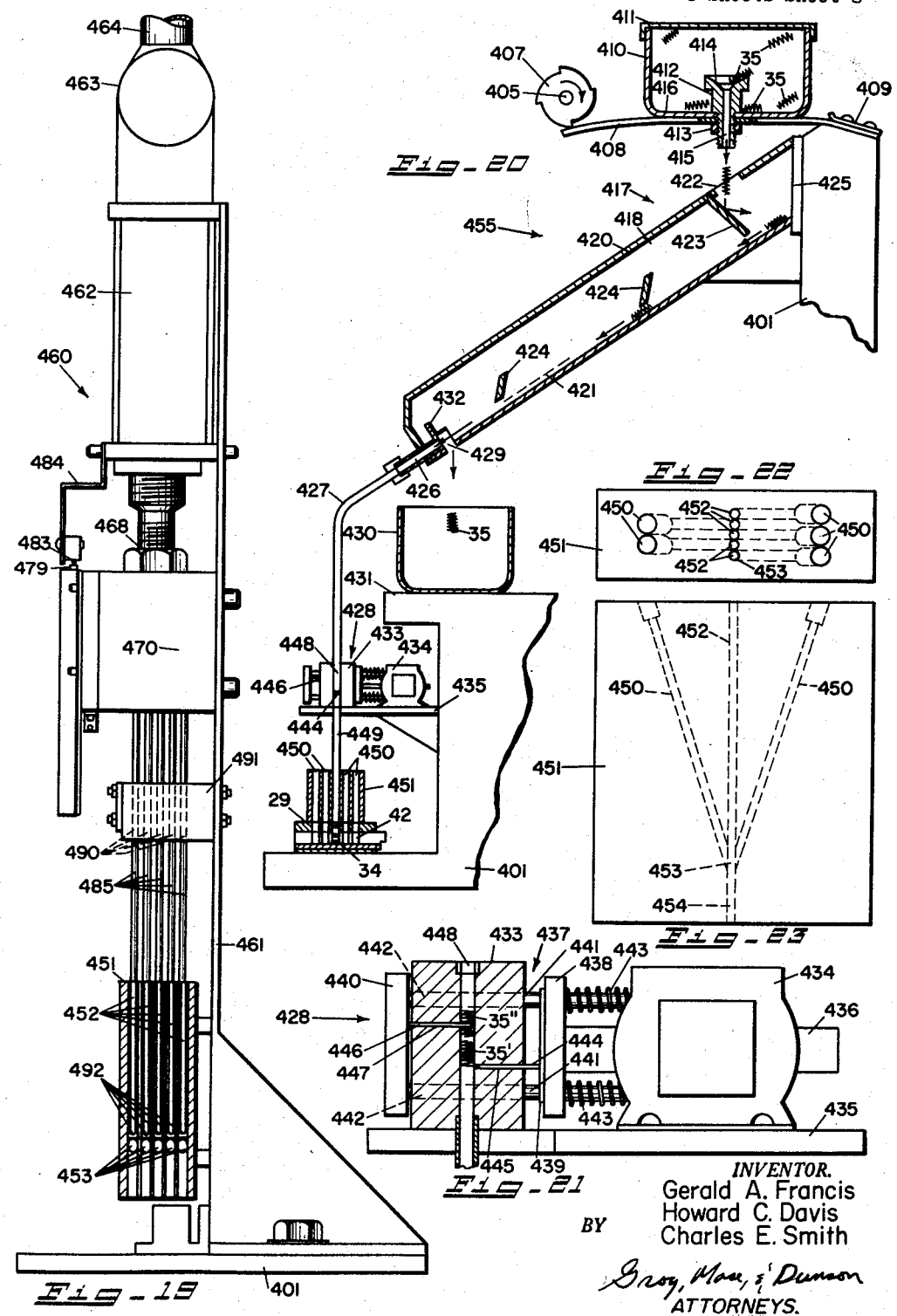

United States Patent Office 2,944,333
Patented July 12, 1960

2,944,333

ASSEMBLY APPARATUS

Gerald A. Francis and Howard C. Davis, Columbus, and Charles E. Smith, Worthington, Ohio, assignors, by mesne assignments, to Hurd Lock & Manufacturing Co., Detroit, Mich., a corporation of Michigan Filed Dec. 23, 1955, Ser. No. 555,047

21 Claims. (Cl. 29—211)

This invention relates to a lock assembling machine. More particularly, it relates to a machine to assemble pins and springs in the body of pin-tumbler-type locks automatically, and successively, in accordance with a predetermined plan of mass production. Pin-tumbler-type locks have many uses in the present-day world. One very common mass use of these locks is in automobiles. Each automobile usually has at least five locks, including two for the doors, one for the ignition, and one each for the glove and trunk compartments.

Although these locks are used in large quantities, most of the operations in their assembly have been manual. With the exception of the lock manufacturing machine shown in Patent 1,679,759, it is believed that lock assembling has remained a substantially manual process requiring semiskilled workers to perform the delicate, tedious, and perfunctory tasks of inserting pins and springs in the lock body.

In order to provide desirable deviation among the locks being assembled, it is necessary that the assembling machine have means of accurately controlling the lock combination and that this control means be easily capable of manipulation to a predetermined plan or schedule of lock combinations.

In order that the assembly apparatus of this invention can be fully understood and appreciated, it is necessary that certain fundamental concepts concerning pin-tumbler locks be understood.

A pin-tumbler lock 29, as shown in Figs. 1 and 2, comprises a cylinder body 30, a key plug 31, a cover 32, a retainer 33, a plurality of pins 34 and springs 35.

The cylinder body 30 comprises a rectangular upper portion 36 formed integrally with a cylindrical lower portion 37. The lower portion 37 is provided with an internal bore 38 to receive the key plug 31 which is adapted to rotate therein. The key plug 31 is provided with at least one longitudinal slide 39 to match a groove of a key 40. The upper portion 36 of the cylinder body 30 is provided with a plurality of aligned adjacent spaced cylindrically bored pin chambers 41. The key plug 31 is provided with a plurality of pin chambers 42 that register with the pin chambers 41.

Each pin chamber 41 contains one of the pins 34. The pins 34 are divided into a driver or upper portion 43 and a tumbler or lower portion 44. The driver portion 43 is provided with shoulder section 98 of reduced diameter at the top. The tumbler portion 44 terminates in a rounded end 79.

In a finished lock 29 ready for use, the upper portion 43 and the lower portion 44 are divided at the pin division 45 into separate disconnected pieces. However, during the assembly process, to be later described in detail, the pins 43 are integrally connected at the pin division 45 by means of a short, small neck portion 46, as shown in Fig. 3.

By way of example, a typical pin 34, used in an automobile pin-tumbler lock may have the following dimensions: pin 34 outside diameter, about 3/32 inch; pin 34 length, about 5/16 inch; shoulder section 1/8, outside diameter about 1/32 less than the pin 34 outside diameter; neck 46 diameter, about .010 inch; and division 45, width (prior to assembly) about .015 inch.

In the final assembled condition, ready for use, the springs 35 urge the pins 34 downward into the pin chamber 42 as far as possible, bearing upon the shoulder of the shoulder section 98 at one end and the cover 32 at the opposite end. When no key is present in the key plug 31, the pins in all chambers are pressed downward to their farthermost position in the pin chamber 42. As shown in the left-hand chamber of the lock 29 of Fig. 1, the upper portion 43 of the pin 34 is engaged partially in the upper chamber 41 and partially in the lower chamber 42 so that rotation of the key plug 31 in the bore 38 is prevented.

When the lock is assembled in operating position in an object, such as an automobile, an extension 47 of the key plug 31 is adapted to engage and restrain the operation of some movable part. The lock 29 is positioned in such a way that rotation of the key plug will release the particular part and allow movement thereof.

It will be seen that when the key plug 31 is prevented from rotating by the pin 34 the use of the part restrained by the extension 47 will be prevented and the object will be locked.

A key 40 for a pin-tumbler lock 29 is provided with positions of previously established elevation or stations 48. The number of stations 48 is equal to the number of lock chambers 41 and the center of each station aligns with the longitudinal axis of the chambers 41 when the key 40 is in proper position in the lock 29.

When the key 40 is inserted into the groove 39 of the key plug 31, the lower portions 44 of the pin 34 are raised in the elevations imposed by a matching key station 48. If the station 48 is of the proper elevation to raise the pin 34 to a position where the pin division 45 matches with the diameter of the bore 38 the key plug 31 will be free to rotate with respect to the particular pin and station, as shown in the right-hand and two adjacent stations of Fig. 1, and as shown in Fig. 2. When a proper key is inserted in a lock 29 all of the pins 34 are elevated to the proper position by the various stations 48, so that the pin divisions 45 on all of the pins 34 in the lock 29 are at the proper elevation to allow the rotation of key plug 34 in the bore 38. When the key plug 31 rotates, the part restrained by extension 47 is released, and thus the proper key unlocks the object.

If an improper key 40 is inserted in a lock 29, conditions will exist such as that shown in Fig. 1. In this situation, although some of the pins 34 may be raised to the proper elevation as shown in the three right-hand stations 48, since the two left-hand stations 48 on the key 40 are of improper heights, the pin divisions 45 on these two pins 34 will be above or below the bore surface 38, and rotation of the key plug 31 will be effectively prevented.

A typical pin-tumbler lock in the conventional practice of the automobile industry is a pin-tumbler lock of five different division length pins and five matching station 48 elevations. These pins 34 of different division lengths differ from one another by reason of a difference in the length of upper portion 43 and lower portion 44. In this conventional practice, then, it will be apparent that in a five-pin lock using pins of five division lengths there is a total possible number of combinations of $5^5$ or 3,125. It is a conventional practice to manufacture about 1,000 of these 3,125 possible combinations.

It has been the conventional "high-volume production" practice to assemble pin-tumbler locks in a series of manual operations requiring many semiskilled workers and alert supervisors to handle the tedious tasks of picking up and placing the relatively small pins in certain positions in the locks according to a predetermined permutation of pin lengths with respect to chamber stations.

Accordingly, it is an object of this invention to provide lock-assembling apparatus which is adapted to insert a pin in a chamber of a lock from a storage bin upon a single-movement actuation by a machine operator. It is a further purpose to provide assembling apparatus that is adapted to place an elongated object in a mating receptacle from a storage position upon the single movement actuation by an operator. It is still a further purpose to provide an assembly apparatus which will insert a spring in a matching chamber from a storage position upon a single movement actuation by an operator. It is yet another object to provide apparatus which will insert a pin in a chamber of a pin-tumbler lock and in addition insert a spring in the same chamber over the pin.

It is a purpose of this invention to provide assembly apparatus which is adapted to insert a plurality of distinguishable elongated objects in a plurality of matching chambers according to a predetermined permutation of object distinguishable features with respect to chamber identification. It is another object to provide assembly apparatus which is adapted to insert one of a plurality of pins of different division lengths in one of a plurality of matching pin chambers of a pin-tumbler lock according to a predetermined permutation of pin division lengths with respect to chamber position within the lock upon the single movement actuation by an operator.

It is an object of this invention to provide apparatus which is adapted in combination to transmit a plurality of lock bodies through a series of successive assembly positions and to perform the following assembly operations in the lock body in successive steps, all operations being performed substantially simultaneously upon the single movement of actuation by an operator; inserting one of a plurality of pins of different division lengths in each of a series of pin chambers in the lock body according to a predetermined permutation of pin division lengths with respect to the position of the chambers in the series; separating the pin into driver and tumbler portions (upper and lower, respectively) while in the chambers; and inserting a spring into position in each chamber over each pin.

It is also an object to provide apparatus for supplying springs to the pin chambers of a pin-tumbler lock, including means for determining whether a pin is present in each pin chamber and means responsive to the determining means, for feeding a spring to each pin chamber that has a pin thereon.

It is an object of this invention to provide an apparatus which will greatly facilitate the control of high-volume production of locks so that locks are produced rapidly in the optimum schedule of lock combinations. It is still a further purpose to provide an apparatus that is adapted to assemble pins and springs in lock bodies by means which greatly reduce the manual tediousness and exactness previously required. It is yet another object to provide apparatus which will automatically assemble the pins and springs in lock bodies at reduced cost by reason of the reduced time of assembly and increased accuracy of assembly.

It is a purpose of this invention to provide apparatus adapted to receive elongated objects of a plurality of size groups, uniformly sized within a group and of a plurality of distinguishable length features but disposed randomly within each group with respect to position; and to convey and orient the objects according to axis and distinguishable features of configuration to a position selected from a series, the selection being changeable from one object to the next.

It is a further purpose of this invention to provide apparatus adapted to receive a group of cylindrical pins substantially identical in length, but identifiable by end configuration, in random position within the group, to convey a single pin to one of a series of chambers in a lock body, and to orient the pin with respect to end configuration and axis before insertion in the lock body.

It is a purpose of this invention to provide an orientator-dispenser mechanism adapted to receive elongated objects being conveyed in oriented relation with respect to their longitudinal axes, and to release one of the objects at a time, orienting the object with respect to its distinguishable end as the object is being released.

It is an object of this invention to provide a sensing-gate mechanism adapted to detain and sense for the presence of a plurality of objects in position to be fed into a receptacle, and to transmit an electrical signal in the event that any one of the predetermined number of objects is not present for feeding. It is a further object to provide a sensing-gate mechanism which is adapted to receive and detain a plurality of lock pins destined for a plurality of chambers in a lock body, to sense the presence of a pin at the gate for each of the chambers, and to transmit an electrical signal in the event that there is no pin present for any one of the chambers in the lock body.

Features of the present invention include: the way in which pins are oriented and conveyed from a storage bin containing the pins, randomly stored with respect to position, to a plurality of orientator-dispenser mechanisms equal in number to the number of chambers to be filled in a lock body; the way in which the pins are released, one at a time, and oriented according to their distinguishable ends by the orientator-dispenser mechanism in response to an electrical signal from a control position; the way in which the pins are detained and checked by the sensing-gate mechanism to ascertain that there has been a pin released and that it is available for each chamber of the lock body; the way in which the lock bodies are held in a fixture in position to receive the plurality of pins; the way in which the control station is adapted to be conveniently set up to provide the proper sequence of signals to provide release of the proper pin by the proper orientator-dispenser mechanism with respect to a certain chamber in the lock body, all according to one of a plurality of permutations which may be established in the signal station; the way in which, upon operation of the sensing-gate mechanism, there is not found to be a proper pin at the gate, the signal station provides a signal either for observation by an operator or directly to the proper orientator-dispenser mechanism which reoperates to orient and release a pin to fill the vacant position at the gate.

Still other features of the present invention include: the way in which the lock-body holding fixture is adapted to move to a second position, remote from the pin-loading position, where each pin is rammed to separate each pin into an upper driver portion and a lower-tumbler portion; the way in which the lock-body holding fixture is moved to another position after being rammed; and the way in which sensing apparatus is provided to verify that each chamber of the lock body contains a pin and to transmit a signal to the spring-release mechanism which releases and conveys a spring to each chamber of the lock body.

Other features of the present invention include: the way in which a plurality of lock springs is separated from random storage and conveyed as singles in oriented position, according to their longitudinal axes, by means of a vibrating container having an upstanding pedestal with a conical central aperture through which the springs are adapted to pass one at a time; and the way in which springs are restrained in their conveyed path and released one at a time by means of an alternately operating pair of needle gate members, in which alternately the first needle member engages the first spring in line, restraining the remaining springs thereon, and the other needle member moves to engage the second spring in line restraining the remaining springs thereon, the first spring being simultaneously released by the withdrawal of the first needle member.

Features of the apparatus for supplying helical springs to the pin chambers of a pin-tumbler lock include: means for determining whether a pin is present in each pin chamber, comprising a rod aligned with each pin chamber, and means yieldably connected to each rod to move the rod at a selected time into its corresponding pin chamber, against the pin if a pin is present in the chamber, and to a greater depth if a pin is not present in the chamber; means communicating with each pin chamber for feeding helical springs thereto singly; means, responsive to each determining means, for causing the feeding means to feed one spring to its associated pin chamber when a pin is present in the chamber, comprising switching means for completing an electrical connection to actuate the feeding means when a pin is present in the chamber and for opening the electrical connection when a pin is not present in the chamber; means for withdrawing the rods from the pin chambers before the springs are fed to the pin chambers; means, including the yieldably connected means, for moving the rods into the pin chambers again, after the springs have been fed to the pin chambers, to press the springs to positions completely within the pin chambers; means for withdrawing the rods again from the pin chambers; and means, responsive to the determining means, for interrupting the operation of the apparatus, and of the associated apparatus for supplying the pins to the pin chambers, when a pin is missing from more than a predetermined number of pin chambers, comprising switching means for opening the electrical connections to all of the spring feeding means, and for modifying an electrical connection in the associated apparatus.

Apparatus for feeding singly to a predetermined receiving location a plurality of substantially identical helical springs that are greater in axial length than in diameter, a part of the present invention, includes the following features: a container for the springs; a vertical cylindrical outlet in the container, having a diameter greater than the diameter of the springs and less than twice the spring diameter; a member in the container having a shallow conical funneling surface located above the bottom surface of the container, having a diameter greater than the length of the springs, and communicating with the outlet; means for vibrating the container substantially vertically so as to raise the springs and cause some of the springs to fall on the shallow conical surface and through the outlet, comprising a flat spring connected to the container and a cam in contact with the flat spring; an inclined trough located with its upper portion below the outlet in the container to catch the springs falling through the outlet; a guide channel formed by the bottom surface in the trough for permitting the springs to slide down the trough in a line along their axes; an impact plate in the trough for breaking apart any tangled springs; a cylindrical outlet in said trough in line with the guide channel at the lower end of the trough, having a diameter greater than the diameter of the springs and less than twice the spring diameter; a hollow guide communicating with the outlet for guiding the springs in line axially to an intermediate stopping location in the apparatus; an opening in the lower end of the trough, adjacent to the outlet, large enough to permit any springs reaching the vicinity of the outlet but failing to enter the outlet to drop through the opening; a receptacle located below the last-mentioned opening for receiving and containing any of the springs dropping through the opening; a release mechanism at the intermediate stopping location for releasing one spring at a time, comprising a lower retainer and an upper retainer located above the lower retainer a distance greater than the length of the springs and less than twice the spring length, and means for alternately releasing one retainer while moving the other retainer into its retaining position in such manner that when the lower retainer is being released the upper retainer is moved into its retaining position, retaining the spring then second lowest in the hollow guide, before the lower retainer releases the spring then lowest in the hollow guide, and that when the upper retainer is being released the lower retainer is moved into its retaining position, to catch the spring then lowest in the hollow guide, before the upper retainer releases the spring; a hollow guide continuation communicating with the intermediate stopping point for conducting each spring released by the release mechanism to the predetermined receiving location; and means responsive to preselected conditions at the receiving location for controlling the operation of the release mechanism.

Another feature of this invention is the way in which the various assembly operations of pin feeding, pin ramming, and spring feeding are performed upon the single movement of actuation by an operator substantially simultaneously, and the way that the previously tedious and pains-taking task of pin-and-spring assembly in lock bodies is reduced to the one operation of loading and unloading a lock body from a fixture and the performance of a simple movement of actuation by the operator.

To these and other ends, this invention comprises the previously described features of apparatus, details of which are disclosed in the following description and attached drawings:

In the drawings:

Fig. 1 is a sectional elevation view of a pin-tumbler lock taken along line 1 of Fig. 2;

Fig. 2 is a sectional elevation view taken along the line 2—2 of Fig. 1;

Fig. 3 is an enlarged view of a typical unseparated pin used in a typical pin-tumbler lock;

Fig. 5 is a perspective view of the turntable and pin-inserting unit, in assembled position thereon;

Fig. 7 is a front elevation view of the sensing-gate mechanism of the pin insertion unit of the invention;

Fig. 8 is a top sectional view taken along the line 8—8 of Fig. 7;

Fig. 16 is a control-system circuit diagram for the pin-loading unit and the pin-ramming unit of the invention;

Fig. 17 is a front perspective view of the spring-inserting unit;

Fig. 18 is a front perspective view of the loader mechanism comprising a portion of the spring-inserting unit;

Fig. 19 is a side-elevation view of the loader mechanism of Fig. 18;

Fig. 20 is a side-elevation view, partly in section, of the spring-feeding mechanism comprising a portion of the spring-inserting unit;

Fig. 21 is a side-elevation view, partly in section, of an escapement mechanism of Figs. 17 and 20;

Fig. 22 is a top view of the spring-collector block of Figs. 17, 19, and 20;

Fig. 23 is a front view of the spring-collector block of Figs. 17, 19, 20, and 22; and Fig. 24 is a schematic diagram of the electrical circuit of the spring-inserting unit.

While the particular lock-assemblying machine to be described with particularity is adapted to assemble the pins and springs in a five-chamber lock, it is apparent that a similar machine could be constructed for the assembly of locks having a different number of chambers.

General aspects of lock-assembling machine

Figure 4:
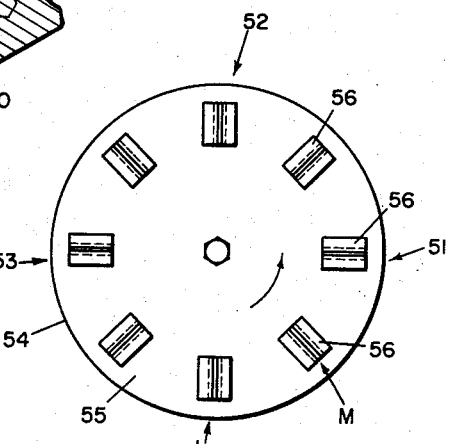
Fig. 4 is a diagrammatic plan view of the turntable lock body conveyer used in this invention.

Referring to Figs. 4, 5, 15, and 17, a lock-assembling machine of this invention comprises: a pin-loading unit, designated generally as 51 (Fig. 5); a pin-ramming unit, designated generally as 52 (Fig. 15); and a spring-loading unit, designated generally as 53 (Fig. 17), which are adapted to be mounted at radially spaced positions around and adjacent to the peripheral edge 54 of a turntable 55 (Fig. 4). The turntable 55 is provided with a plurality of radially spaced fixtures 56, eight being shown in Fig. 4. Each fixture is adapted to receive and hold the cylinder body 30 of a pin-tumbler lock 29 with its rectangular upper portion 36 in the vertically uppermost position. The fixture 56 is fastened to the turntable 55 by suitable means such as screws, preferably in a position so that the longitudinal bore of the fixture has its longitudinal axis passing through the center of rotation of the turntable 55. All fixtures 56 are substantially equidistant from the center of rotation of the turntable 55. The turntable 55 is adapted to rotate through successive intermittent steps carrying each fixture 56 angularly through a series of progressive steps to a plurality of angularly offset stations with respect to the lock-assembling machine. In the lock-assembling machine of this invention, three different assembly operations are performed by the machine, one by each of the pin-loading units 51, the pin-ramming unit 52, and the spring-loading unit 53.

As shown diagrammatically in Fig. 4, the several units 51, 52, and 53 may be disposed at the stations on the turntable 55 which are 90 degrees apart. One station, designated L in Fig. 4, is provided for loading lock bodies 30 into and for unloading locks 29 from the fixtures 56.

In the normal operation of the lock-assembling machine, lock bodies 30 are loaded singly into the fixtures 56 during the time that the fixture 56 remains stationary at the loading station L in the intermittent rotary progress of the turntable 55. The lock bodies 30 have their pin chambers 41 empty at the time they are loaded and are without the cover 32. Each just-described "empty" lock body 30 is provided with a hardened key blank at the time it is loaded into the fixture 56. Each empty lock body 30 progresses within a fixture 56 to a position beneath the pin-loading unit 51 where a pin 34 is inserted in each chamber 41 according to a predetermined permutation of pin division lengths. After the pins 34 are inserted in the chambers 41, the lock body 30 is carried progressively with the intermittent rotary action of the turntable 55 to a position beneath the ramming unit 52 where the pins 34 are rammed by means of a sharp blow from above and the neck portions 46 are crushed for the purpose of separating each pin into an upper portion 43 and a lower portion 44. After the pins are rammed, the lock body 30 moves within the fixture progressively through the successive stations to a position below the spring-loading unit 53. At this position, springs 35 are inserted in the pin chambers 41 over each pin 34, therein.

After the springs 35 have been inserted in the lock body 30, the fixture 56 progresses with the intermittent rotary motion of the turntable 55 to the loading position L where the assembled lock 29 is removed from the fixture 56 by an operator, and is replaced with an empty lock body 30.

In the normal operation of the lock-assembling apparatus, all three of the assembly operations, i.e., pin-loading, ramming, and spring-loading, are performed substantially simultaneously at each station by the single movement of actuation by an operator. This single movement of operation comprises the closing of an electrical contact through a switch, such as the foot switch 58, as shown in Fig. 5.

Pin-loading unit

Referring to Fig. 5, the pin-loading unit 51 comprises: a pin conveyer and storage section, designated generally as 60, supported above and to the side of the turn-table 55; a plurality of orientator-dispensing mechanisms, designated generally as 61, suspended from vertical frame members 62 adjacent to the pin storage and conveyer section 60 and adapted to receive pins therefrom; a plurality of chutes 63 connected to the bottom of the orientator-dispenser mechanisms 61 disposed substantially vertically and adapted to convey pins from the orientator-dispenser mechanisms 61 downward; and a sensing-gate mechanism 64 positioned directly above a station of the turntable 55 and connected at the lower terminus of the chamber 63, adapted to verify the arrival of a pin 34 for each pin chamber 41 of the empty lock body 30 to be loaded and to release the pins 34 into the empty lock bodies 30.

Figure 14:
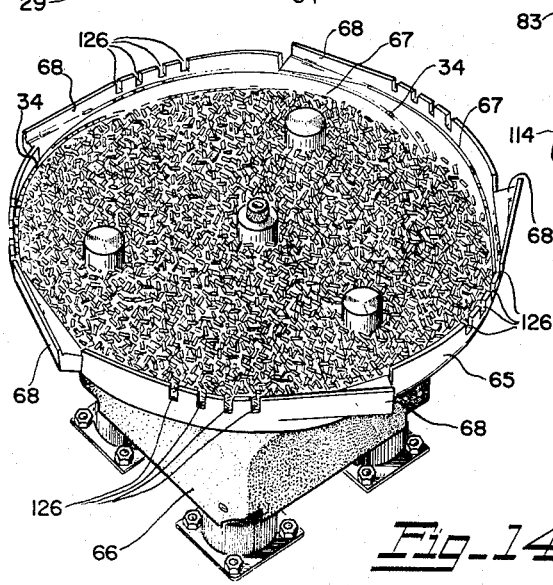
Fig. 14 is a perspective view of one vibrator feed and storage bowl used in the present invention.
Figure 6:
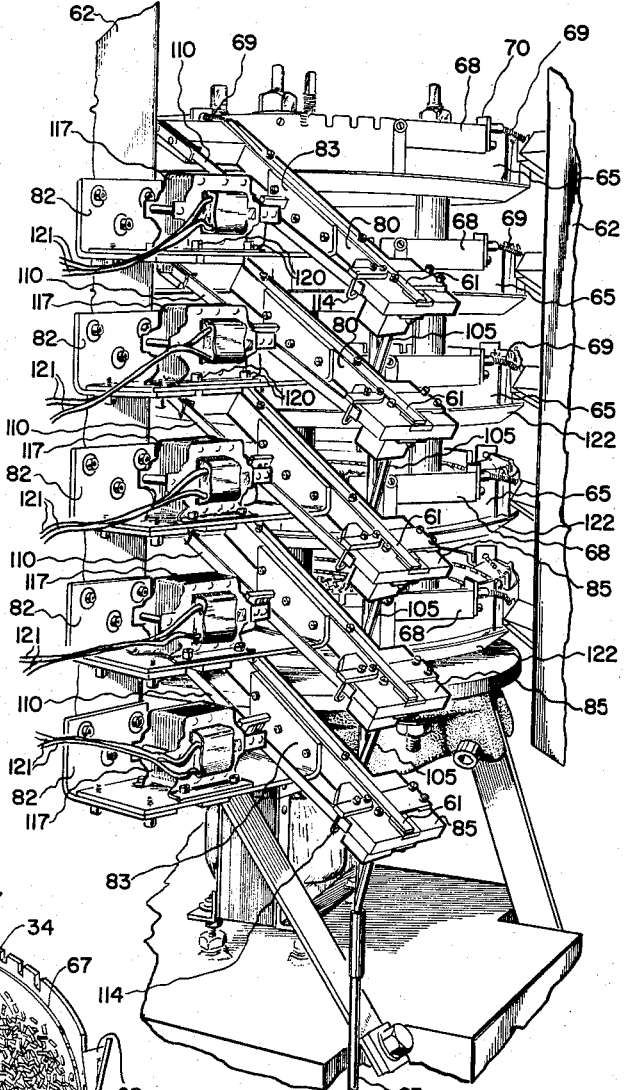
Fig. 6 is an enlarged perspective view of the vibrator storage and feed bowls and the orientator-dispenser mechanisms of the invention.

Referring to Figs. 5, 6, and 14, the pin-storage and conveyer unit 60 comprises a plurality of bowl members 65 horizontally supported and fastened together in tiered relation. The bowls 65 are supported as a unitary structure by the central spindle of a vibrator motor 66 of the type shown in U.S. Patent 2,696,292. Each bowl is provided with a plurality of spiral congeneric grooves 67 formed on the inner peripheral wall.

Since the particular lock-assembling machine is constructed to assemble pins 34 in a lock 29 having five chambers 41, the bowls 65 are provided with five different spiral grooves 67 (Fig. 14). Each spiral groove 67 is adapted to receive a plurality of lock pins 34 in single file and disposed with their longitudinal axes slightly inclined upward. Each groove 67 terminates in a tangential portion 68. As shown most clearly in Fig. 6, in the assembled machine each tangential portion 68 is fastened to a spring chute 69 by means of a spring-support member 70 which is connected to the end of the tangential portion 68.

Figure 9:
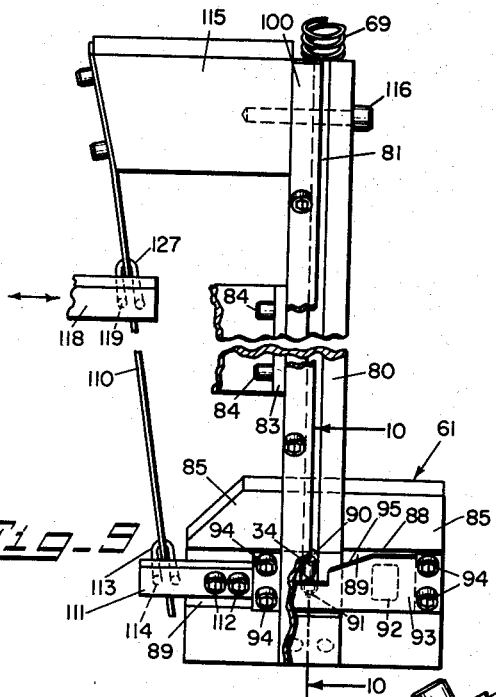
Fig. 9 is a top perspective view of the orientator-dispenser mechanism of the pin-insertion unit of the invention.

Before operation of the pinning unit 51 is commenced, each bowl 65 is loaded with randomly placed pins 34. The bowls are large enough to hold several thousand pins of the size conventionally used in automobile locks, as shown in Fig. 14. During the normal operation of the pin-loading unit 51 and as shown in the circuit diagram of Fig. 16, a source of electrical energy is provided to the vibrator coil 66 which, in accordance with the principle of U.S. Patent 2,696,292, provides a vibratory oscillatory motion to the bowls 65. When the vibrator coil 66 operates, the oscillatory vibratory movement of the bowl 65 causes the pins 34 therein to "migrate" to the periphery of the bowl 65 and to become lodged in the spiral grooves 67. The movement of the bowls causes the pins to advance upward and outward along the path of the groove 69 and to be conveyed in single file through the tangential portion 68 and the spring chute 69 where the pins enter the orientator-dispenser mechanism 61 (Fig. 9). During operation the pins are being conveyed continuously into the orientator-dispenser mechanisms. One orientator-dispenser mechanism 61 is provided for each spiral groove 67 outlet on each bowl. The pins 34 that are deposited into the orientator-dispenser mechanism 61, while longitudinally disposed in single file, are randomly disposed with respect to end configuration. In this respect the pins may be traveling either with the shoulder section 98 foremost and the tumbler portion 44 rearmost or vice versa.

Referring to Figs. 6, 14, and 5, each bowl 65 is provided with a plurality of notches 126 in the outer peripheral side and adjacent to the tangential portions 68. The notches 126 extend vertically downward to intersect the spiral grooves 67 and are adapted to allow broken, bent, or otherwise malformed pins 34 traveling in the grooves 67 to fall outward and be rejected. These broken or bent pins 34 fall into one of a plurality of trays 122, most clearly seen in Fig. 6, that are fastened one beneath each bowl 68. The trays 122 are fastened integrally with the bowl 68 and the oscillatory-vibratory motion of the bowl 68 structure is imparted to the trays 122 which convey the malformed pins in the trays 122 to a central aperture (not shown) at the rear of the machine. As shown in Fig. 5, one of a plurality of tubular chutes 123 conveys the malformed pins from the aperture in the trays 122 to one of a plurality of containers 124 which are supported on a shelf 125 of the machine frame.

Figure 10:
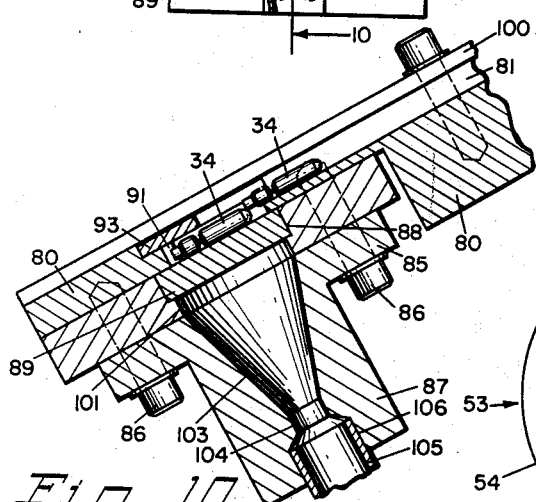
Fig. 10 is a sectional elevation view taken along the line 10—10 of Fig. 9.

Referring to Figs. 6, 9, and 10, the orientator-dispenser mechanism 61 comprises a grooved chute member 80 having a groove 81 connected in prolongation of the spring chute 69. An angular support member 82 is bolted to the frame member 62 and is provided with an upstanding flange portion 83 which supports the chute member 80 in an inclined position by suitable fastening means, such as bolts 84.

A slide block 85 is fastened beneath and is supported at the lower end of the chute member 80 by a suitable means, such as screws 86, as most clearly shown in Fig. 10. A tube-chute-support member 87 is fastened beneath the slide block 85 by means of the bolts 86 also.

The slide block 85 is provided with a groove 88 having its longitudinal axis perpendicular to the longitudinal axis of the groove 81 in the chute member 80. The groove 88 extends the length of the slide block 85 and is shown as substantially rectangular in cross-sectional shape. A slide 89 having a cross-sectional shape complementary to that of the groove 88 is provided in the groove 88 and is adapted to reciprocate therein. The slide 89 is positioned directly below the chute member 80.

Groove 81 is provided at its lower terminal end with a gaging aperture 90 of a shape similar to that of a pin 34 (Fig. 9). The gaging aperture 90 is provided with a portion of decreased width at its lower terminus 91 which is adapted to receive the shoulder section of a pin 34. The length of the gaging aperture 90 is slightly longer than the length of the pin 34.

The slide 89 is provided with an aperture 92 at a position longitudinally removed from the position of the gaging aperture 90, in the normal position of rest of the slide member 89, as shown in Fig. 9. The aperture 92 is only slightly longer than the portion of maximum diameter of a pin 34.

A cam plate 93 is provided above the upper surface of the slide 89 at a distance slightly more than the diameter of a pin 34, and is fastened thereto by suitable means, such as screws 94. Cam plate 93 is provided at one side thereof with an inclined surface 95 laterally spaced from the gaging aperture 90. The inclined surface 95 is contoured into a recess portion 96 adjacent and over the gaging aperture 90.

A cover plate 100 is positioned on the upper surface of the chute member 80, and is adapted to partially enclose the groove 81 at its upper side.

The slide block 85 as shown most clearly in Fig. 10 is provided with an aperture 101 positioned beneath gaging aperture 90 of groove 81. The aperture is aligned with downward converging sides 103 of the tube-chute support block 87. Converging sides 103 of the tube support block 87 are contoured into a cylindrical bore 104. A tubular chute member 105 is positioned beneath the bore 104, and is received in a counter bore 106 by a light press fit.

A spring arm 110 is operatively connected to the slide 89 by means of a connecting link 111 which is fastened to the slide 89 by suitable means such as screws 112 (Fig. 9). The spring arm 110 is operatively connected to the connecting link 111 by means of projecting side member 113 of a U clip 114.

The spring arm 110 is fastened at its opposite upper end to a post 115 which is connected at the side to the chute member 80 by suitable means, such as a bolt 116.

An electric solenoid 117 (Fig. 6) having a reciprocal arbor 118 is operatively connected to the spring arm 110 by means of projecting side members 119 of a U clip 127. One lug 119 is provided on each side of the spring arm 110 and is adapted to engage the side of and to flex the arm 110 upon reciprocation of the arbor 118, as shown by the arrows in Fig. 9. The solenoid 117 is positioned on the horizontal flange of the support member 82 and fastened thereto by suitable means, such as bolts 120. Wire leads 121 are provided from the solenoid 117 to a source of electrical energy, as shown in the circuit diagram in Fig. 16.

Tubular chute 105 from each orientator-dispenser mechanism 61 is connected to and feeds into one of the chutes 63, as seen in Fig. 6. In the lock-assembling machine of the example, since each lock has five chambers, there are five pin chutes 63, one being adapted to convey a pin 34 for each pin chamber 41. Also, in the example machine, pins of five different division lengths are used and each bowl 65 contains pins 34 of the same division length only. An orientator-dispenser mechanism 61 is provided for each of the five outlets on each of the five bowls making a total of twenty-five orientator-dispenser mechanisms 61.

Figure 12:
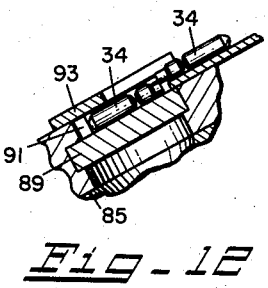
Fig. 12 is a sectional elevation view of a portion of the orientator-dispenser mechanism under a different condition of operation from that shown in Fig. 10.

In the normal operation of the orientator-dispenser mechanism 61, pins are fed from the spring chute 69 into the groove 81 where they slide down its inclined surface in abutting, single-file relationship. The lowermost or "first" pin 34 slides into the gaging aperture 90 and rests on the slide 89, as shown in Figs. 10 and 12. If the first pin has the shoulder section 98 forward, the shoulder section projects into the terminus portion 91, and rests in the relative position shown in Fig. 10. If the first pin 34 has its shoulder section 98 rearward, the larger diameter of the body engages the entrance shoulder of the terminus portion 91 and the body portion is held in the same relative position, as shown in Fig. 12.

The following or "second" pin 34 slides to an abutting position behind the first pin, taking a position with its shoulder section 98 in contact with the end 79, as shown in Fig. 10, or a position with the shoulder end of the section 98 abutting the end of the shoulder section of the first pin as shown in Fig. 12.

It often occurs that the first and second pins may arrive with ends 79 abutting or with the first pin having its shoulder section 98 rearward and the second pin with its shoulder section 98 rearward. However, the conditions illustrated in Figs. 10 and 12 serve to illustrate the operation of the orientator-dispenser mechanism 61 under all four possible pin 34 arrival conditions.

Figure 13:
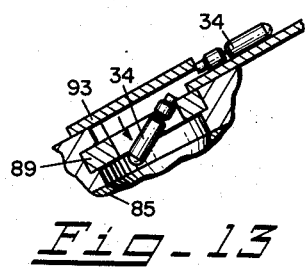
Fig. 13 is a sectional elevation view of the orientator-dispenser mechanism with the slide block at a different position from that shown in Fig. 12.
Figure 11:
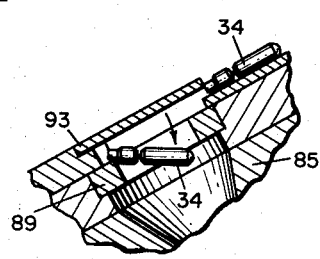
Fig. 11 is a sectional elevation view of a portion of the orientator-dispenser mechanism with the slide block at a different position than that shown in Fig. 10.

When the solenoid 117 is energized, the arbor 118 is actuated to the left, as viewed in Fig. 9. The projecting lug 119 on the right side of the spring arm 110 engages and flexes the spring arm 110 to the left. The movement of the spring arm 110 to the left moves the slide 89 to the left, sliding in the groove 88. As the slide 89, with the cam plate 93, moves to the left the inclined surface 95 engages the second pin 34. As the slide 89 continues to the left, the inclined surface 95 forces the second pin backward and upward in the groove 81 to a disengaged position with respect to the first pin 34, as shown in Figs. 11 and 13. The slide 89 continues to move to the left until the aperture 92 is positioned below the groove gaging aperture 90, at which time the pin 34 falls through the aperture 92 by the action of gravity and continues downward through the convergent sides 103, through the throat 104, and into the chute 63 by means of the tubular chute 105.

In the event that the first pin 34 is disposed in the gaging aperture 90 with its shoulder section 98 foremost, the shoulder section 98 engages on the forward edge of the aperture 92 causing the pin to rotate clockwise and descend with the shoulder section 98 upward, as shown in Fig. 11. If, on the other hand, the first pin 34 is disposed with the shoulder section 98 rearward, the pin 34 is rotated in the opposite direction which causes the pin to fall with the shoulder section 98 upward, as shown in Fig. 13. Thus, the orientator-dispenser mechanism 61 operates to release a single pin oriented as to its end configuration, i.e., the shoulder section 98 upward or rearward upon the activation of the solenoid 117.

As the slide 89 moves to the left, the cover 100, which projects partially over the groove 81, prevents the second and succeeding pins from "climbing out" of the groove 81 as they are forced rearward by the inclined surface 95.

The use of a spring member 110 as the actuating lever for the slide 89 is an advantage in that overloads on the solenoid 117 are prevented in the event a pin 34 jams in the orientator-dispenser mechanism 61. Since the pins 34 may be relatively small, on infrequent occasions imperfectly formed pins 34 may be conveyed into the orientator-dispenser mechanism 61. In this event, the imperfect pin may prevent the proper reciprocal action of the slide 89. Under these circumstances, when the solenoid 117 is actuated the spring arm 110 flexes beyond its normal operating position and all strains on the operating mechanism are relieved without harm.

As will be later described in further detail, the failure of the orientator-dispenser mechanism 61 to function properly and allow a pin 34 to descend through the chute 63 is detected in the controls. The orientator-dispenser mechanism may be operated again, in which case the jam may be released; or the mechanism may receive the attention of an operator. However, it has been found that, with the exclusion of malformed pins that exceed normal production tolerances, the orientator-dispenser mechanism of this invention is substantially infallible and is capable of providing 6,000 oriented pins per hour without attention.

By reason of the fact that an orientator-dispenser mechanism is provided to feed from each bowl 65 to each chute 63, the pin-loading unit 51 is capable of providing a pin of any one of five different division lengths in any one of the five pin chambers of a lock 29. The provision of a certain size pin for a certain chamber is accomplished by the provision of electrical energy to the solenoid 117 of the proper orientator-dispenser mechanism 61 on the chute 63 which feeds the selected chamber 41.

Referring to Figs. 5, 7, and 8, the sensing-gate mechanism 64 comprises: a composite escapement block 130 which is supported above the turntable 55 at the position for pin loading; a gate subassembly, designated generally as 131, which is supported by the escapement block 130; and a sensing subassembly, designated generally as 132 supported by the escapement block 130.

Escapement block 130 comprises a plurality of plate members 133 fastened in contiguous position by suitable means such as bolts 134 (Fig. 8). In the sensing-gate mechanism of the example, since the locks 29 to be filled have five chambers, five intermediate plates 133 are clamped between outer plates 133. Each intermediate plate 133 is provided with an internal passage 135 from an aperture 136 at the lower horizontal surface 137 of the escapement block 130 to the upper horizontal surface 138 terminating in an enlarged bore 139 which is adapted to receive the terminal end of a chute 63. The position of entrance of the terminal ends of the chutes 63 are staggered with relation to each other for clearance purposes, as shown in Fig. 8. The escapement block 130 and the apertures 136 are arranged so that a lock 29 being held in a fixture 56 on the turntable 55 will be positioned with the five empty chambers 41 thereof directly below the apertures 136 of the passages 135. The escapement block 130 is held in this position by means of a support member 140 which is fastened to the machine frame by suitable means, not shown.

At the right side of the escapement block 130, as seen in Fig. 7, a support bracket 141 is fastened by suitable means such as screws 142. An electric solenoid 143 is suspended from the support bracket 141 by means such as screws 144. The solenoid 143 is provided with a reciprocal arbor 145 to which is fastened a gate support block 156 by means of a screw 157. Gate support block 156 carries a platelike gate 158 which is adapted in its normal position to cover the apertures 136 of escapement block 130. The gate 158 reciprocates to the right, being carried by the support block 156 upon the reciprocation of the arbor 155 when the solenoid 143 is energized. Spring means 159 is provided to return the arbor 155 to the normal position when the solenoid 143 is de-energized.

A sensing assembly support block 165 is fastened at the lower side of escapement block 130 by means such as screws 166. Support block 165 is substantially L-shaped in plan view, as shown in Fig. 8, comprising a longitudinal portion 167 and a base portion 168. A plurality of electrical switches 169 having contact buttons 171 are bolted in contiguous side-by-side relation against the side of the leg portion 167 by means such as bolts 170.

A support member 172 is fastened to the upper surface of the base portion 168 by suitable means such as bolts 173, and supports an electric sensing solenoid 174 by means such as bolts 175 therein.

The sensing solenoid 174 is provided with a reciprocable arbor 176 having fastened thereto a transverse head 177 (Fig. 8). Sensing rod head 177 is provided with a plurality of adjacent spaced longitudinal bores 188 each of which is adapted to receive therein a sensing rod 179 by smoothly sliding fit. Base portion 168 of support block 165 is provided with a plurality of adjacent spaced bores 180 coaxial with the bores 178 of the head 177. The sensing rods 179 are disposed in the bores 178 and 180 and are adapted to slide and contact the switch buttons 171 of the switches 169.

Each sensing rod 179 is provided with a collar 181 rigidily fastened thereto. Each collar 181 is provided with a downwardly depending finger 182. The finger 182 is formed in a 90-degree bend at the lower edge of the base portion 168 of the support member 165, and extends horizontally into a receptive passage 183 in the escapement block 130. The passage 183 terminates at its inner end in a passage 135 at a position adjacent the aperture 136 thereof.

A lateral recess groove 186 is provided in the base portion 168 to give freedom of movement for a compression spring 187 which encircles the sensing rod 180 and engages the collar 181. A second compression spring 188 encircles the sensing rod 180 engaging the opposite side of the collar 181 at one end and the head 177 at the other end.

A laterally disposed guide bar 189 depends horizontally from the base portion 168, as most clearly seen in Fig. 7. The guide bar 189 is provided with a vertical elongated slot 190 perpendicularly below the line of action of each sensing rod 180. Each finger 182 projects through the slot 180 which is vertically beneath the sensing rod 180 from which that finger 182 depends. The slot 190 maintains the vertical alignment of the upper portion of the finger 182 and limits the reciprocable horizontal travel of the sensing rod 180.

In the normal operation of the pin-loading unit 51, a pin 34 is dispensed from one of the orientator-dispenser mechanisms 61 into each of the chutes 63 and progresses downward into the sensing-gate mechanism 64. The descending pins 34 enter the passages 135 of the escapement block 130 and pass downward to a position of rest on the gate 158 in the position shown in the broken section portion of Fig. 7. After sufficient time has been allowed for the arrival of all five pins at the rest position on the gate 158, electrical energy is provided to the solenoid 174 which moves the arbor 176 and the head 177 to the right, as viewed in Fig. 7. As the head 177 moves to the right each collar 181 is independently urged to the right by means of a spring 188. As each collar 181 moves to the right, its depending finger 182 moves to the right until the end of the finger contacts a pin 34 at its position of rest on the gate 158. In this position of finger engagement of the pin 34, the sensing rod 178 has not traveled far enough to the right to contact the button 171 of the switch 169, and the continued travel to the right of the head 177 is taken up by further compression of the spring 188 as the head 177 slides to the right on the sensing rod 179.

In the event that there has been a malfunction of an orientator-dispenser mechanism 61 and any one of the passages 135 is empty at the pin rest position, the finger 182 passes beyond the normal position of pin engagement at the end of passage 183 during the reciprocal travel to the right of the sensing rod 179. This overtravel of the finger 182 allows the sensing rod 179 to progress far enough to the right to operate the switch 169 by means of the push button 171. Operation of the switch 169 closes an electrical circuit which provides a signal on a control panel 315 and also may be connected to actuate the particular orientator-dispenser mechanism 61 a second time. Upon perception of the "empty" chamber signal and correction of the malfunction by the operator so that a pin 34 reaches the pin rest position on the gate 158, the solenoid 174 is reoperated to verify that a pin 34 is present on the gate 158 for each of the chambers 41 of the lock body 30 positioned below in a fixture 56.

After each sensing operation that senses five pins present, the solenoid 174 is de-energized and the arbor 176 with head 177 is returned to normal position by means of the springs 188 and 187. Fingers 182 and collars 181 are returned at the same time. Simultaneously, the gate solenoid 143 is energized to retract the gate 158 by reciprocation of the arbor 155 to the right. When the gate 158 moves to the right all pins are released and fall into the chambers 41 of a lock body 30.

When loaded into the lock body 30, the upper portion 43 and the lower portion 44 of each pin 34 are integrally connected by means of the neck 46 (Fig. 3). In order for a pin-tumbler lock to operate, the upper portion 43 and the lower portion 44 of the pins 34 must operate as separate pieces and it is therefore a step in the lock-assembly process to crush the neck 46 and compress the material thereof into the plane of the line of division 45 after the pin 34 has been inserted in the lock body 30.

*Pin-ramming unit*

Figure 15:
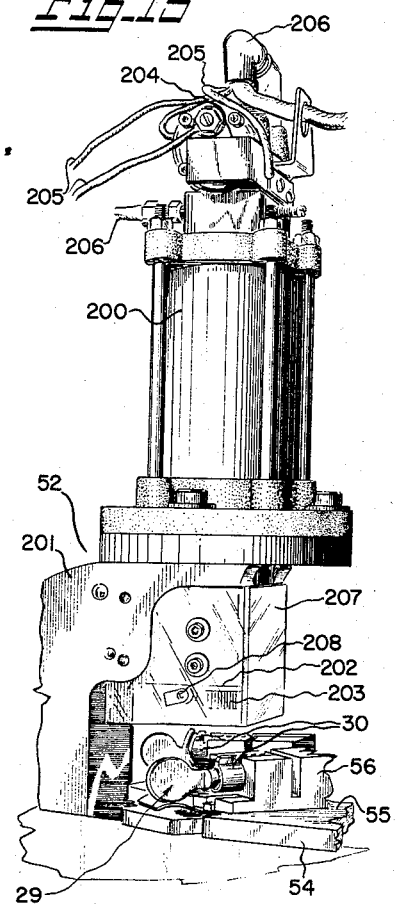
Fig. 15 is a perspective view of the ramming mechanism used in the present invention.

Referring to Fig. 15, the pin-ramming unit 52 comprises a fluid cylinder 200 mounted on a cantilever frame 201 and positioned with the longitudinal axis of the cylinder 200 vertically disposed above the central chamber 41 of a lock body 30 that is held in a fixture 56 on the turntable 55. The cylinder 200 is preferably of conventional construction having a reciprocal piston therein adapted to move up and down upon application of a fluid (such as air) under pressure to the top or bottom of the piston, respectively. A platelike ram 202 is fastened to the bottom of the piston rod, as shown in Fig. 15. A plurality of substantially cylindrical vertically aligned dies 203 is connected into the ram 202. Each die 203 is vertically aligned with a chamber 41 in the fixture 56.

Since the ramming unit 52 is positioned at a station around the turntable 55 that sequentially follows the pin-loading unit 51, all chambers 41 of the lock body 30 in the fixture 56 beneath the ramming unit 52 should contain a pin 34.

An electrically operated fluid valve means 204 is mounted on the top of the fluid cylinder means 200 and is adapted to control the flow of air either to the top or bottom of the piston in the cylinder 200. The fluid valve means is preferably of conventional construction and is adapted to perform its fluid-control function upon the provision of electrical energy at wire leads 205.

Conduit means such as piping 206 is provided to furnish air pressure for the operation of the cylinder 200 from a source not shown.

As a safety precaution, a transparent shield 207 is fastened to the frame 201 enclosing the ram 202 and dies 203.

In the normal operation of the ramming unit 52 electrical energy is provided to the proper leads 205 in accordance with a program established by the control system 250, as shown in Fig. 16 to be described later in detail. When the turntable 55 is stationary and a lock, having unseparated pins 34 vertically disposed therein, is in position beneath the ram 202, the electrically operated valve functions to direct the air into the cylinder 200 forcing the ram 202 with the dies 203 downward until the dies 203 strike the pins 34 on the top of the shoulder section 98 with sufficient force to crush the neck portions 46. In the crushing action the upper portion 43 descends to meet the lower portion 44, causing the material of the neck 46 to be flattened and shredded to wafer thinness, whereby its supporting and connecting usefulness is destroyed. After the pins 34 have been struck by the dies 203, the upper and lower portions 43 and 44 are unconnected.

When the ram 202 reaches the bottom of its downward stroke and the dies 203 strike the pins 34, an electrical switch 208, the operative wheel thereof being shown in Fig. 15, is closed which operates the fluid valve means 204. Valve means 204 operates to change the flow of air into the cylinder 200 and reverse the action of the piston and ram 202 returning the ram 202 to its normal up position.

*Control system for pin-loading and pin-ramming units*

In order that the lock-assembling machine shall be capable of coordinating the functions of the various assembly units 51, 52, and 53, and to assure the proper cooperative combined action of all the parts of the machine the electromechanical control systems shown in Figs. 16 and 24 are provided. While provision is made in the pin-loading unit control system, designated generally as 250, to control the initial signal for the operation of the spring-loading unit 53, the spring-loading unit control circuit 251 has been separated as a matter of descriptive convenience and is shown in detail in Fig. 24.

Referring to Fig. 16, a lead 255 for a first side and a lead 256 for a second side of the control system 250 are provided for connection to a source of electrical power. A two-pole line switch 257 is provided across both sides of the line and is connected to leads 255 and 256. A pin-release circuit 258 is connected across the line having a normally closed relay switch 259, a normally closed limit switch 260, a foot switch 58, and a pin-selection relay 261 in series. A turntable operation circuit 262 is connected in the pin-release circuit 258 between the foot switch 58 and the pin-selection relay 261 and is connected to the second side of the line through a motor 263 for the operation of the turntable 55. The turntable motor 263 is provided with a conventional sustaining circuit connection 264 that is connected to the pin-selection circuit 258 between the limit switch 260 and the foot switch 58. A sensing-gate mechanism activator circuit 265 is connected across the line having a time-delay relay 266 and a normally closed cam switch 267 in series. Cam switch 267 is closed by the action of the turntable 55 when the turntable 55 is at a standstill.

A ram actuator circuit 268 is connected across the line having a normally closed relay switch 269, a ram actuator relay 270, and a normally closed cam switch 282 connected in series. For operation of the ramming unit 52 a low-voltage circuit 271 is provided across the line having a transformer 272 connected between opposite sides of a two-pole switch 273. A ram control circuit 274 is connected across the low-voltage side of the transformer 272. The ram control circuit 274 comprises parallelly connected "ram down" valve relay 275 in series with a normally open relay switch 276, and "ram up" valve relay 277 in series with a normally closed relay switch 278 and a normally open limit switch 279.

As indicated by the dashed line in Fig. 16 relay switches 259, 276, and 278 are operated by means of ram actuator relay 270.

A plurality of pin-dispenser circuits 285, 286, 287, 288, 289 is provided which are connected across the line as shown with particularity for pin-dispenser circuit 285. One pin-dispenser circuit is provided for each chamber 41 of the locks 29 being assembled in the pin-assembling machine. In the pin-assembling machine of the example, because the machine is constructed to assemble lock 29 having five chambers 41, five pin-dispensing circuits are shown in Fig. 16. However, since pin-dispensing circuits 286, 287, 288, and 289 are identical with pin-dispensing circuit 285, only pin-dispensing circuit 285 is shown with particularity.

In the pin-dispenser circuit 285 one side of a multiple-position selector switch 290 is connected to the first side of the line. Each of the second side leads of the selector switch 290 is connected through an indicator light 291 to the second side of the line. Another multiple-position selector switch 292 is connected to one side of the line through alternate leads, one of which is provided with a normally open relay switch 293 and the other of which is provided with a normally open push-button switch 294. The second side leads of the selector switch 292 are connected through the orientator-dispenser solenoids 117 to the other side of the line. The relay switch 291 is operated by the pin-release relay 261 as shown by the dashed line on Fig. 16. The multiple-position selector switches 292 and 290 are mechanically interlocked so that selective positioning of the switch 292 completing the circuit to any particular one of the orientator-dispenser solenoids 117 will complete the circuit to a correlated indicator light 291.

A sensing solenoid 295 is connected across the line having a normally open relay switch 296, a normally closed relay switch 297, the sensing solenoid 174, and a normally closed push-button switch 308 connected in series. Also connected across the line is the correction and indicator circuit 298, having in series the relay switch 296, the gate-operating solenoid 143, the normally closed push-button switch 308, normally closed limit switches 169 of the sensing assembly 132, and a normally open relay switch 300. A relay 301 is connected in parallel with the gate solenoid 143. An empty chamber indicator light 302 is connected in parallel across each of the limit switches 169. A lock-in circuit 305 is connected across the line in series with the normally closed push-button switch 308 and the relay switch 296.

Vibrator coil 66 is connected across the line to a double-pole line switch 304.

Referring to Fig. 5, a portion of the controls shown in the control system 250 is housed in a cabinet 315. Controls for the parts feeder 66 may be housed in a separate cabinet 316. The operating toggle of the line switch 304 and knob 306 for adjusting the rate of vibration of the parts feeder 66 project from the forward side of the cabinet 316. In addition, the operating toggle of the line switch 273 projects from the forward side of the cabinet 316.

The forward face of the control cabinet 315 is provided with the indicating lights 291 arranged in vertically aligned rows for each chamber of a five-chamber lock to be assembled, i.e., all of the indicator lights 291 or one dispensing circuit, for instance, 285, are arranged in a vertical line. The lights 291 are arranged in each vertical line in accordance with a predetermined order of pin division lengths that are being deposited in the bowls 65. Each horizontal row of lights thus represents a different pin division length that is available for feeding into the pin chambers 41 of the lock bodies 30. A knob 319 for each of the multiple-position selector switches 292 is positioned below the indicator lights 291 which it controls. "Empty chamber" indicator lights 302 are arranged in a horizontal row on the front of the cabinet 315, one beneath each row of indicator lights 291 and selector switch knobs 319. The push-button switches 292 for single-chamber pin feed are arranged in a horizontal row with the proper push button 292 disposed below the vertical line of indicator lights 291 of the particular dispenser circuit 285, 286, 287, 288, or 289 to which the push-button switch 292 is a part. Normally closed sensing push-button switch 308 and line switch 257 are also positioned on the front face of the cabinet 315.

Time delay relay 266 is mechanically interlocked with relay switches 269 and 296 as shown by the dashed line in Fig. 16. Relay switch 297 is mechanically interlocked with relay 301 and relay switch 300 is mechanically interlocked and operated by relay 307.

Prior to the time that operation is commenced, line switches 257, 273, and 304 are closed and the turntable is set at one of the stationary positions with a fixture 56 beneath each of the operative units 51, 52, and 53. At each stationary position of the turntable, cam-operated normally closed switch 267 of the sensing-gate actuator circuit 265 is closed.

After a suitable warm-up period, the operator places an empty lock body 30 having a hardened steel blank key in each of the fixtures 56 located at the first two stations, indicated as L and M in the turntable diagram of Fig. 4. With these two fixtures containing empty lock bodies 30, the operator causes the assembly operations to commence by the single movement of actuation of the foot switch 58. Momentary closing of the foot switch 58 closes the turntable operation circuit 262 to the turntable motor 263 causing the turntable 55 to rotate and index to the next position. During the indexing movement of the turntable 55 the turntable operation circuit 262 through the turntable motor 263 is maintained by means of the connection 264 of the conventional sustaining circuit connected to the turntable motor 263.

When the foot switch 58 is closed the pin-selection relay 261 is energized causing the operation of all of the pin-dispenser circuits 285, 286, 287, 288, and 289 through the relay switches 291. In each of these dispenser circuits the closing of relay switch 291 energizes one of the orientator-dispenser mechanism solenoids 117. The selection of the proper solenoid 117 is determined by the position of the selector switch 292 as indicated by which of the indicator lights 291 is lighted on the front of the control panel 315. Operation of one of the solenoids 117 in each of the dispenser circuits 285, 286, 287, 288, and 289 causes a pin 34 to be released for each chamber 41 in the lock body 30, which is being carried to the pin-loading unit position by the indexing operation of the turntable 55. During the indexing of the turntable 55 the cam switch 267 is opened de-energizing the time-delay relay 266 and opening relay switch 296 and closing relay switch 269.

When the turntable 55 has indexed one station the cam switches 267 and 282 close. The closing of cam switch 282 energizes relay 270 which closes the "down valve" relay switch 276 causing the ram 202 to descend in the ramming operation. At the same time the relay switch 259 is opened preventing operation by the foot switch 58 during the delay period. The ram opens limit switch 260 at the bottom of its stroke preventing operation by the foot switch 58 while the ram is down. After a delay of several seconds, time delay relay 266 operates and opens switch 269 and closes relay switch 296. The opening of switch 269 de-energizes the relay 270 closing switch 259. At the same time, relay switch 276 is opened and relay switch 278 is closed completing the circuit through the "up" valve relay 277 changing the valve 204 and causing the ram 202 to be raised to the up position. When the ram 202 goes up, normally closed limit switch 260 closes making the pin-selection circuit 258 ready for the next operational cycle. Upward operation of the ram 202 allows the normally open limit switch 279 to open preventing further operation of the valve 204 to the "up" valve position unless the ram 202 has been returned to the down position.

Upon the closing of the relay switch 296 after the delay period at the end of the index operation, the sensing solenoid 174 is energized causing the fingers 182 to move to the right and "feel" for the presence of a pin 34 in release position on the gate 158. If each finger 182 contacts a pin so that none of the normally closed limit switches 169 are contacted by the rods 179, the correction and indicating circuit 298 is unbroken through the switches 169, gate solenoid 143, and relay 301. In order to prevent the operation of the gate solenoid 143 before the fingers 182 have had time to "feel" for the presence of pins 34, the correction-and-indicating circuit 298 is closed after a very slight delay through the action of delay solenoid 307. Upon the closing of relay switch 300 the solenoid 143 is energized, retracting the gate 158 from beneath the pins 34 in the escapement head 130 and the pins are allowed to fall into the chambers 42.

In the event that one or more pins have not arrived in the escapement head 130 in position on the gate 158, the overtravel of the finger 182 at that particular gate position allows the rod 179 to contact the button 171 of a switch 169, which opens the switch. Opening of a switch 169 causes current to flow through the particular indicating light 302 connected in parallel therewith. This causes the indicating light 302 to light up on the face of the control panel 315 which may be seen by the operator. At the same time passage of the current through the indicating light 302 raises the resistance of the circuit 298 to a value that decreases the current flow so that gate solenoid 143 and relay 301 are not operable. As soon as the operator is aware of the signal provided by the lighted "empty chamber light" 302, the operator may push the "single-chamber pin feed" push button 292 in the selector circuit 285, 286, 287, 288, or 289 causing the reactivation of the particular orientator-dispenser mechanism 61 that has failed to provide a pin in the empty chamber.

Operation of the push button 292 will ordinarily clear any jams in the orientator-dispenser mechanism 61, unless a malformed pin has caused the trouble. After operation of the push button 292, the arrival of a pin at the empty chamber position on the gate 158 may be detected by operation of the normally closed sensing pushbutton switch 308 in the resensing circuit 305. Opening of the switch 308 de-energizes the entire sensing-gate circuit.

As soon as the assembly condition is fulfilled, wherein a pin 34 is present at each chamber position on the gate 158, the release of the button 308 will cause the completion of the correction and signal circuit 298 through the limit switches 169, the relay switches 296 and 300, the gate solenoid 143 and through relay 301. Completion of the circuit 298 through the gate solenoid 143 operates the gate 158, and releases the sensing solenoid 174 through relay switch 297. This allows the pins to fall and the fingers to retract.

Closing of line switch 304 causes the vibrator coil 66 to operate and give oscillatory-vibratory movement to the bowls 65 providing for the continuous feed of pins into the orientator-dispenser mechanisms 61.

A normally closed relay switch 281 is provided in the second side of the line operated by a relay 511 of the spring-loading unit 53 control circuit 251.

In the event that there is a malfunction in the spring-loading unit 53, the relay 511 is activated to open the relay switch 281 which shuts off operation of the remainder of the lock-assembly machine including the pin-loading unit 51 and the ramming unit 52 until the trouble has been corrected.

A single-acting make-and-break relay 280 is connected in the sensing-gate actuator circuit 265 between delay relay 266 and cam switch 267. The relay 280 operates a normally open relay switch 514 of the spring-loading unit 53 control circuit 251.

When the cam switch 267 is closed at the end of the index operation of the turntable 55 the single-action make-and-break relay 280 operates to close the relay switch 514 momentarily. After momentary closing the switch 514 is opened until the next cycle. Closing of the relay switch 514 operates the spring-loading unit 53 as herein described elsewhere.

In the use of the lock-assembling machine of this invention, it is a simple matter to produce locks assembled with pin and chamber combinations conforming to a predetermined plan of high-volume mass production. The operator may be provided with a schedule setting forth the quantity of any particular lock combination and a sequence of manufacture for particular lock combinations. These may be rapidly set up on the control panel of the assembling machine by means of setting the knobs 319 of the selector switches 292. The particular combination which is set up on the control panel is readily discernable by the visual observation of the lighted indicator lights 291 on the face of the control panel 315. After setting the knobs the operator may actuate the machine by pressing the foot switch 58 the number of times necessary to provide the number of locks required according to the schedule.

*Spring-supplying and inserting unit 53*

Referring now to Figs. 17–24, the spring-supplying and inserting unit 53 is mounted on a main frame 401. An electric motor 402 provided with speed-reduction gearing 403 is connected through a coupling 404 to a shaft 405 supported by pillow blocks 406—406. Mounted on the shaft 405 are five cams 407—407. Each cam 407 contacts a flat spring 408 mounted on the frame 401, as is indicated at 409 (Fig. 20). Mounted on each flat spring 408 is a container 410 covered by a lid 411. In each container 410 is a bolt-like member 412 mounted vertically in the container 410, protruding through the bottom of the container 410 and through the spring 408, and held in place by a nut 413. The member 412 has a shallow conical funneling surface 414 communicating with a vertical cylindrical outlet 415.

The container 410 is partially filled, preferably not above the funneling surface 414, with helical springs 35—35, as most clearly seen in Fig. 20. The springs 35—35 are substantially identical helical springs, greater in axial length than in diameter. The outlet 415 has a diameter greater than the diameter of the springs 35—35 and less than twice the spring diameter. The shallow conical funneling surface 415 is located above the bottom surface 416 of the container 410, and the diameter of the funneling surface 414 is greater than the length of the springs 35—35. Rotation of the cam 407 in contact with the flat spring 408 vibrates the container 410 substantially vertically, causing the springs 35—35 therein to move about, breaking loose any tangled springs, particularly when they strike the lid 411, and causing some of the springs 35—35 to fall on the shallow conical surface 414 and through the outlet 415.

Below each container 410 is an inclined trough 417, located with its upper portion below the outlet 415. The trough 417 is formed by two lower members 418, 419 and a cover 420, providing a triangular cross section. The intersection of the side members 418, 419 provides a guide channel 321 in the bottom surface of the trough 417 for permitting the springs 35—35 to slide down the trough 417 in a line along their axes.

An opening 422 in the cover 420 of the trough 417 is located directly below the outlet 415 of the container 410, so that the springs falling through the outlet 415 are caught by the trough 417. An impact plate 423 is located in the trough 417 just below the opening 422, to break apart any springs that might otherwise tend to tangle. Baffles 424—424 may be provided in the trough 417 to aid in directing the springs 35—35 in the guide channel 421 formed by the intersection of the lower members 418, 419 of the trough 417. The trough 417 is mounted on the frame 401, as is indicated at 425 in Fig. 20.

A cylindrical outlet 426 is located in line with the guide channel 421 at the lower end of the trough 417. The outlet 426 has a diameter greater than the diameter of the springs 35—35 and less than twice the spring diameter. Connected to the end of the outlet 426 is a length of tubing 427 communicating with the outlet 426 providing a hollow guide for guiding the springs 35—35 in line axially to an escapement mechanism 428, which provides an intermediate stopping location for the springs 35—35.

An opening 429 is provided in the lower end of the trough 417 adjacent the outlet 426. The opening 429 is large enough to permit any of the springs 35—35 reaching the vicinity of the outlet 426, but failing to enter the outlet 426, to drop through the opening 429 into a receptacle 430, which is located below the opening 429 to receive and contain any of the springs 35—35 that drop through the opening 429. The receptacle 430 is placed on a shelf 431 of the main frame 401. A flat plate 432 deflects into the opening 429 those springs 35—35 that do not enter the outlet 426.

The escapement mechanism 428, shown most clearly in Fig. 21, includes an escapement block 433 and a solenoid 434 mounted on a shelf 435 of the main frame 401. The solenoid 434 actuates a plunger 436 to which is connected a framework 437. The framework 437 includes a retainer plate 438, a rubber cushion 439, an end plate 440, and two rods 441—441. The rods 441—441 extend through cylindrical holes 442—442 in the escapement block 433 and into similar holes (not shown) in the solenoid 434. Helical compression springs 443—443 on the rods 441—441 between the retainer plate 438 and the solenoid 434 force the framework 437 to the left, as in Fig. 20, when the solenoid 434 is not energized. When the solenoid 434 is energized, the plunger 436 and the framework 437 are pulled to the right as in Fig. 21.

A pin 444 is connected to the retainer plate 438 of the framework 437 for movement in a cylindrical hole 445 in the escapement block 443. A pin 446 is connected to the end plate 440 of the framework 437 for movement in a cylindrical hole 447 in the escapement block 443. The horizontal cylindrical holes 445, 447 communicate with a vertical cylindrical passage 448 in the escapement block 433. The tubing 427 is connected to the upper end of the cylindrical passage 448 in the escapement block 433. When the solenoid 434 is not energized, the lower retainer pin 444 protrudes into the cylindrical passage 448 as in Fig. 20, retaining all of the helical springs above it in the passage 448 and in the tubing 427.

In the unenergized position of the solenoid 434, the upper retainer pin 446 is located to the left of the cylindrical passage 448 of the escapement block 433. When the solenoid 434 is energized, the plunger 436 is pulled to the right, as in Fig. 21, with the lower retainer pin 444 to the right of the passage 448 and with the upper retainer pin 446 protruding into the passage 448. The upper retainer pin 446 is located above the lower retainer pin 444 a distance greater than the length of the springs 35—35 and less than twice the spring length. When the solenoid 434 is energized, the lower retainer pin 444 recedes from the cylindrical passage 448, releasing the spring 35', which is the lowest in the cylindrical passage 448.

While the lower retainer pin 444 recedes from the cylindrical passage 448, the upper retainer pin 446 protrudes into the passage 448 into the middle of the spring 35", which is the second lowest spring in the passage 448. The upper retainer pin 446 thus retains the spring 35" and all springs above it in the passage 448 and in the tubing 427 before the lowest spring 35' is released by the lower retainer pin 444. When the solenoid 434 again becomes unenergized the springs 454—443 force the framework 437 to the left. The lower retainer pin 444 protrudes into the passage 448 before the upper retainer pin 446 is completely withdrawn from the passage 448, releasing the spring 35". When the upper retainer pin 446 is clear of the passage 448 the spring 35" drops down against the lower retainer pin 444 into the position formerly occupied by the spring 35'. Alternately energizing and de-energizing the solenoid 434 alternately releases the lower retainer pin 444 and the upper retainer pin 446 while moving the other retainer pin 446, 444 into its retaining position, thereby releasing one spring 35 at a time at the intermediate stopping location 428.

A length of tubing 449 is connected to the lower end of the cylindrical passage 448 in the escapement block 433 and to the upper end of a cylindrical spring-delivery tube 450 in a spring-collector block 451 (Figs. 17, 20, 22, and 23). The spring-collector block 451 is provided with five spring-delivery tubes 450—450, one for each pin chamber 42 of the lock 29. The spring-collector block 451 is provided also with five vertical cylindrical passages 452—452 extending through the block 451. Each of the spring-delivery tubes 450—450 communicates with one of the vertical passages 452—452, as is indicated at 453. The lower portion 454 of each vertical passage 452 of the spring-collector block 451 communicates with a pin chamber 42 of the lock 29.

A spring released by the escapement mechanism 428 passes through the tubing 449, a spring-delivery tube 450, and the lower end 454 of a vertical passage 452 to a pin chamber 42 of the lock 29, to rest on a pin 34 therein. The combined components 407—449 of Fig. 20 comprise a spring-feeder apparatus 455, five of which are employed in the spring-supplying and inserting unit 53 of Fig. 17. The tubing 449 of each spring-feeder apparatus 455 is connected to a different one of the spring-delivery tubes 450—450 of the spring-collector block 451 for delivery of a spring 35 to each pin chamber 42 in the lock 29.

*Sensing and loading mechanism 460*

Referring now to Figs. 17–19, a portion of the spring-supplying and inserting unit 53 comprises a sensing and loading mechanism 460. A mounting post 461 connected to the main frame 401 supports the other components of the sensing and loading mechanism 460. An air motor 462 is connected through a control valve 463, a pipe 464, a regulator 465, and an air line 466 to a source of compressed air (not shown). A bearing block 467 is connected to the lower end of the air motor 462 by threaded members 468. The air motor 462 provides movement along a vertical line. When the valve 463 is in the "down" position, the air motor 462 moves the bearing block downward between a left-side bearing 469 and a right-side bearing 470 far enough for the left side 471 of the bearing block 467 to contact the arms 472, 473 of two push-button switches 474, 475, respectively. When the valve 463 is in the "up" position, the air motor 462 moves the bearing block 467 back up to the position shown in Figs. 18 and 19.

A mounting pin 476 and a holding spring 477 hold a switch-actuating mechanism 478 in position on the front of the bearing block 467. The member 478 includes four switch-actuating pins 479—479 extending radially outwardly from the member 478 and spaced ninety degrees apart around the circumference of the member 478. Eight smaller pins 480—480, for positioning the switch-actuating member 478, also extend radially outward from the member 478. The positioning pins 480 are located forty-five degrees apart around the circumference of member 478, four of the pins 480—480 being located directly behind the pins 479—479 and the other four being located behind and midway between the switch-actuating pins 479—479. The friction provided by the holding spring 477 and the mounting pin 476 maintains the switch-actuating member 478 in a position as determined by the action of an actuating arm 481 on the positioning pins 480—480. The actuating arm 481 is made of thin flat spring metal and is held in place by a bracket 482 connected to the right-side bearing 170.

When the air motor 472 moves the bearing block 467 downward with the switch-actuating member 478 in the position shown in Fig. 18, with each of the switch-actuating pins 479—479 forty-five degrees away from the vertical, the top edge of the actuating arm 481 contacts the positioning pin 480 extending horizontally to the right, at the bottom of the down stroke, turning the switch-actuating member 478 forty-five degrees. On the upward return stroke of the bearing block 467 one of the switch-actuating pins 479—479 is in a vertical position as in Fig. 19. As the end of the up stroke, the vertically positioned switch-actuating pin 479 closes a push-button switch 483. At the bottom of the next down stroke, the switch-actuating arm 481 turns the switch-actuating member 478 forty-five degrees more, returning the switch-actuating member 478 to a position as shown in Fig. 18. On the return up stroke the switch-actuating pins 479—479 are located forty-five degrees away from the vertical and do not contact the push-button switch 483.

The switch 483 is held by a mounting bracket 484. Five sensing rods 484—485 are resiliently connected to the bearing blocks 467 by means of a U-shaped lifting member 486 and five cylindrical members 487—487, one connected to each sensing rod 485. Each cylindrical member 487 protrudes part way into a cylindrical guide hole (not shown) in the bearing block 467. A compression spring 488 located between the bearing block 467 and a shoulder 489 on the cylindrical member 487 presses the horizontal portion of the sensing rod 485 against the horizontal portion of the sensing rod lifting member 486.

The sensing rods 485—485 are guided by cylindrical holes 490—490 extending through a sensing rod guide block 491. The lower ends 492—492 of the sensing rods 485—485 extend into the vertical cylindrical holes 452—452 of the spring-collector block 451. When the bearing block 467 is in its upper position as in Figs. 18 and 19, the lower ends 492—492 of the sensing rods 485—485 are located just above the junctions 453—453 where the spring guide passages 450—450 communicate with the vertical passages 452—452 in the spring-collector block 451.

At the bottom of a down stroke the sensing rods 485—485 extend into the pin chambers 42—42 of the lock 29. When a pin 34 is present in each pin chamber 42, the ends 492—492 of the sensing rods 485—485 contact the ends of the pins 34—34, with the lower ends 493—493 of the cylindrical members connected to the horizontal portions of the sensing rods 485—485 located above the five push-button switches 501, 502, 503, 504, 505. Should a pin be missing from one of the pin chambers 42—42 in the lock 29, the sensing rod 485 extending into that chamber 42 would be pressed farther into the chamber 42 by the bearing block 467, and the end 493 of the cylindrical member 487 would be moved down far enough to push down the push button of the corresponding switch 501—505. For example, if a pin were not present in the first pin chamber 42, the first sensing rod 485 would extend further into the first pin chamber 42 than if a pin were present, and the lower end 493 of the first cylindrical member 487 would push the push button of the first switch 501.

The bearing block 467 moves down far enough to press the lower end 493 of the cylinder 487 against the push button of the switch 501 if there is no pin in the first pin chamber 42, or the corresponding switch 502, 503, 504, or 505 if a pin is missing from one of the other pin chambers 42—42. Normally pins 34—34 are present in the pin chambers 42—42 and stop the downward movement of the sensing rods 485—485 before the completion of the down stroke of the bearing block 467. The remainder of the down stroke of the bearing block 467 compresses the springs 488—488 against the shoulders 489—489 of the cylindrical members 487—487.

*Electrical control system 251*

Fig. 24 shows schematically the electrical control system 251 of the spring-supplying and inserting unit 53. A power line or other A.C. voltage source 506 is connected through a double-pole single-throw switch 507 to a pair of conductors 508, 509. The conductor 508 is connected through the normally closed relay switch 510 of a shutdown relay 511 to a conductor 512. Ganged to the relay switch 510 is the normally closed relay switch 281 of the pin-loader control circuit 250. The relay 511 is a circuit-breaker-type relay that must be reset whenever the switches 510 and 281 are open. The conductor 509 is connected to one terminal of a time-delay relay 513. The conductor 512 is connected through a single-pole single-throw switch 514 to the other terminal of the time-delay relay 513. The switch 514, which is normally open, is closed momentarily by the relay 280 in the pin-loading control circuit 250.

Connected in parallel with the switch 514 are the contact arm 515 and associated contact point 516 of the relay 513. The relay 513 is a time-delay relay that controls the contact arms 515, 517, 518, and 519 in such a manner that when the relay 513 is not energized, the contact arms 515, 517, 518, 519 are in their lower position as shown in Fig. 24, with the contact arm 515 away from the contact point 516, with the contact arm 517 contacting the associated contact point 520, with the contact arm 518 away from the contact point 521, and with the contact arm 519 away from the contact point 522; and when the relay 513 is energized the contact arms 515, 517, 518, 519 are moved to their upper position with the contact arm 515 contacting the contact point 516, with the contact arm 517 contacting the contact point 523, with the contact arm 518 contacting the contact point 521, and with the contact arm 519 contacting the contact point 522, for a predetermined time slightly longer than the time required for the bearing block 467 to travel from its upper position as shown in Figs. 18 and 19 to its lower position at the end of the down stroke. At the end of the predetermined time, the contacts 515, 517, 518, 519 return to their lower position as shown in Fig. 24.

The conductor 512 is connected to one end of the primary winding 524 of a step-down transformer 525. The other end of the primary winding 524 is connected to the conductor 509. The contact arm 517 of the time-delay relay 513 is connected to one end of the secondary winding 526 of the step-down transformer 525. The other end of the secondary winding 526 is connected to one terminal of a valve-control solenoid 527 and to one terminal of a valve-control solenoid 528. The other terminal of the valve-control solenoid 528 is connected to one terminal of the normally open push-button switch 475, the other terminal of which is connected to the contact point 520. The other terminal of the valve-control solenoid 527 is connected to the contact point 523. One terminal of the normally open push-button switch 483 is connected to the contact point 523, and the other terminal is connected to the contact point 520.

The conductor 512 is connected to the contact arm 518. The contact point 521 is connected to one terminal of a counter 529, the other terminal of which is connected to the conductor 509.

When the valve-control solenoid 527 is energized, it moves the valve 463 to the position that causes the air motor 462 to move the bearing block 467 downward to its lower position. When the valve-control solenoid 528 is energized, it moves the valve 463 to the position that provides an upward movement of the air motor and of the bearing block 467 to the upper position, as shown in Figs. 18 and 19.

The conductor 512 is connected to one terminal of the motor 402, which drives the shaft 405 and the cams 407—407 to vibrate the spring containers 410—410. The other terminal of the motor 402 is connected to the conductor 509.

The conductor 512 is connected to one terminal of the normally open, single-pole, single-throw, push-button switch 474, the other terminal of which is connected to one terminal of a relay 530. The other terminal of the relay 530 is connected to the conductor 509. The relay 530 controls a contact arm 531 associated with a contact point 532. The contact arm 531 is connected to the conductor 512. The contact point 532 is connected to the contact arm 519. When the relay 530 is not energized, the contact arm 531 remains in its upper open position away from the contact point 532 as is shown in Fig. 24. When the relay 530 is energized, the contact arm 531 moves to its lower position in contact with the contact point 532.

One terminal of a normally open, single-pole, single-throw, push-button switch 533 is connected to the conductor 512 and the other terminal is connected to the contact point 522. The operator manually closes the switch 533 when it is desired to check the operation of the escapement mechanism 428—428 and associated components without operating the sensing and loading mechanism 460.

The contact point 522 is connected by a conductor 534 to each of the five switch contact arms 501, 502, 503, 504, and 505.

The conductor 509 is connected to one terminal of each of the escapement solenoids 434a, 434b, 434c, 434d, and 434e; to one terminal of each of the trouble-indicator lights 541, 542, 543, 544, and 545; and to one terminal of each of the relays 551, 552, 553, 554 and 555. The other terminal of the first escapement solenoid 434a is connected to a contact point 561 associated with the first switch arm 501. The other terminal of the first trouble-indicator light 541 and the other terminal of the first shutdown control relay 551 are connected to a contact point 571 associated with the first switch arm 501. The switch arm 501 is normally in the upper position in contact with the contact point 561 as shown in Fig. 24. When the bottom end 493 of the first cylindrical member 487 (Fig. 18) presses down the switch arm 501, the switch arm 501 is moved to its lower position in contact with the contact point 571.

The other terminal of the second escapement solenoid 434b is connected to a contact point 562 associated with the second switch arm 502. The other terminal of the second trouble-indicator light 542 and the other terminal of the second shutdown control relay 552 are connected to a contact point 572 associated with the second switch arm 502. The switch arm 502 is normally in the upper position in contact with the contact point 562 as shown in Fig. 24. When the bottom end 493 of the second cylindrical member 487 (Fig. 18) presses down the switch arm 502, the switch arm 502 is moved to its lower position in contact with the contact point 572.

The other terminal of the third escapement solenoid 434c is connected to a contact point 563 associated with the third switch arm 503. The other terminal of the third trouble-indicator light 543 and the other terminal of the third shutdown control relay 553 are connected to a contact point 573 associated with the third switch arm 503. The switch arm 503 is normally in the upper position in contact with the contact point 563 as shown in Fig. 24. When the bottom end 493 of the third cylindrical member 487 (Fig. 18) presses down the switch arm 503, the switch arm 503 is moved to its lower position in contact with the contact point 573.

The other terminal of the fourth escapement solenoid 434d is connected to a contact point 564 associated with the fourth switch arm 504. The other terminal of the fourth trouble indicator light 544 and the other terminal of the fourth shutdown control relay 554 are connected to a contact point 574 associated with the fourth switch arm 504. The switch arm 504 is normally in the upper position in contact with the contact point 564 as shown in Fig. 24. When the bottom end 493 of the fourth cylindrical member 487 (Fig. 18) presses down the switch arm 504, the switch arm 504 is moved to its lower position in contact with the contact point 574.

The other terminal of the fifth escapement solenoid 434e is connected to a contact point 565 associated with the fifth switch arm 505. The other terminal of the fifth trouble-indicator light 545 and the other terminal of the fifth shutdown control relay 555 are connected to a contact point 575 associated with the fifth switch arm 505. The switch arm 505 is normally in the upper position in contact with the contact point 565 as shown in Fig. 24. When the bottom end 493 of the fifth cylindrical member 487 (Fig. 18) presses down the switch arm 505, the switch arm 505 is moved to its lower position in contact with the contact point 575.

One terminal of the shutdown relay 511 is connected to the conductor 509. The other terminal of the shutdown relay 511 is connected by a conductor 535 to one terminal of each of the relay switches 583a, 584a, 582b, 585a 584b, and 582c. The conductor 508 is connected to one terminal of each of the relay switches 581a, 582a, 581b, 583b, 583c, and 585b. A conductor 536 connects together the opposite terminals of the relay switches 581a, 582a 583a, and 584a. A conductor 537 connects the opposite terminals of the relay switches 581b, 583b, 582b, and 585a. A conductor 538 connects together the opposite terminals of the relay switches 583c, 585b, 584b, and 582c.

The shutdown control relay 551 controls each of the relay switches 581a, 581b, which are ganged. When the relay 551 is not energized, the relay switches 581a, 581b remain in their upper, open position as shown in Fig. 24. When the shutdown control relay 551 is energized, the relay switches 581a, 581b are moved to their lower, closed position. The shutdown control relay 552 controls each of the relay switches 582a, 582b, 582c, which are ganged. When the relay 552 is not energized, the relay switches 582a, 582b, 582c remain in their upper, open position as shown in Fig. 24. When the shutdown control relay 552 is energized, the relay switches 582a, 582b, 582c are moved to their lower closed position. The shutdown control relay 553 controls each of the relay switches 583a, 583b, 583c, which are ganged. When the relay 553 is not energized, the relay switches 583a, 583b, 583c remain in their upper, open position as shown in Fig. 24. When the shutdown control relay 553 is energized, the relay switches 583a, 583b, 583c are moved to their lower, closed position. The shutdown control relay 554 controls each of the relay switches 584a, 584b, which are ganged. When the relay 554 is not energized, the relay switches 584a, 584b remain in their upper, open position as shown in Fig. 24. When the shutdown control relay 554 is energized, the relay switches 584a, 584b are moved to their lower, closed position. The shutdown control relay 555 controls each of the relay switches 585a, 585b, which are ganged. When the relay 555 is not energized, the relay switches 585a, 585b remain in their upper, open position as shown in Fig. 24. When the shutdown control relay 555 is energized, the relay switches 585a, 585b are moved to their lower, closed position.

From Fig. 24 it is apparent that when any two or more of the shutdown control relays 551, 552, 553, 554, 555 are energized a connection is completed from the conductor 508 to the conductor 535, and the shutdown relay 511 is energized, opening the relay switches 510, 281, and disconnecting all of the electrical components of the spring-supplying and inserting unit 53, and of the pin loading and ramming units 51, 52, from the alternating voltage source 506.

Operation of spring unit 53

The spring-supplying and inserting unit 53 of Figs. 17-24 operates as follows:

The operator closes the main switch 507, starting the motor 402, which continuously rotates the shaft 405 and the cams 407—407 thereon. The rotation of each cam 407 causes the flat spring 408 in contact therewith to vibrate the container 410 mounted thereon. The springs 35—35 in each container 410 move about because of the vibration. Many of the springs 35—35 fall on the conical funneling surface 414 of the boltlike member 412, and drop through the cylindrical outlet 415 onto the impact plate 423 in the trough 417. Each spring 35 that drops through the outlet 415 and through the opening 422 in the cover 420 of the trough 417, is deflected from the impact plate 423 onto the guide channel 421 formed at the bottom of the trough 417 by the intersection of the left-side member 418 and the rightside member 419. The spring 35 slides down the guide channel 421 into the cylindrical outlet 426 and through the tubing 427 to the escapement mechanism 428.

The first spring 35' rests on the lower retainer pin 444, the second spring 35'' rests on the first spring 35', and each of the other springs 35—35 rests on the next lower spring 35 in the cylindrical channel 448 and in the tubing 427. If any spring fails to enter the opening 426 at the bottom end of the trough 417 it is deflected by the plate 432 and drops through the opening 429 into the receptacle 430.

The relay 280 closes the switch 514, energizing the time-delay relay 513, which moves the contact arms 515, 517, 518, 519 to their upper position. The contact arm 515 contacts the contact point 516 keeping the time-delay relay 513 energized for a predetermined time slightly longer than the time taken by the bearing block 467 to reach the bottom of its down stroke. The contact arm 517 contacts the contact point 523, energizing the valve control solenoid 527 which moves the valve 463 to the position that causes the air motor 462 to move the bearing block 467 downward. The contact arm 518 contacts the contact point 521 energizing the counter 529, which indicates the number of locks 29 to which springs 35—35 are supplied. The contact arm 519 contacts the contact point 522.

When the bearing block 467 (Fig. 18) reaches the bottom of its down stroke, the left side 471 of the bearing block 467 pushes the arm 472 of the switch 474 and the arm 473 of the switch 475 to the left, closing the switch 474 and the switch 475. The closing of the switch 474 energizes the relay 530 which moves the contact arm 531 to its lower position in contact with the contact point 532. A connection is completed from the conductor 512 through the contact arm 531, the contact point 532, the contact arm 519, and the contact point 532 to the conductor 534. If a pin 34 is present in each of the chambers 42—42 of the lock 29, the switch arms 501, 502, 503, 504, 505 remain in their upper position as shown in Fig. 24 energizing each of the escapement solenoids 434a, 434b, 434c, 434d, 434e.

After the escapement mechanisms 428—428 release one spring to each of the pin chambers 42—42, the time-delay action of the relay 513 releases the contact arms 515, 517, 518, 519 to their lower position as shown in Fig. 24. The valve control relay 528 is energized by the completion of the connection to the secondary 526 of the transformer 525 through the contact arm 517, the contact point 520, and the switch 475, which has been closed by the bearing block 467. The valve-control solenoid 528 moves the valve 463 to the position that causes the air motor 462 to pull the bearing block 467 back up to its upper position.

At the beginning of the down stroke of the bearing block 467, the switch-actuating member 478 was in the position shown in Fig. 18 with the switch-actuating pins 478—478 at forty-five degree angles to the vertical. At the bottom of the down stroke, the switch actuating pin 480 pointing horizontally to the right contacted the actuating arm 481 and was rotated forty-five degrees as it moved downward against the actuating arm 481. This movement turned the switch-actuating pin 479 that was pointing upward and to the right of the vertical on the down stroke, to the vertical position.

As the bearing block 467 moves up away from the switch arms 472, 473 the switches 474, 475 open. At the top of the up stroke of the bearing 467 the switch-actuating pin 479 pointing vertically upward closes the switch 483 as in Fig. 19. This completes a connection from the secondary 526 of the transformer 525 through the contact arm 517, the contact point 520, and the switch 483 to the valve control solenoid 527, energizing the solenoid 527 and moving the valve 463 to the position that causes the air motor 462 to move the block 467 downward again.

Before each escapement solenoid 434 was energized, its upper retainer pin 446 was located to the left of the cylindrical passage 448 of the escapement block 433. When the escapement solenoid 434 was energized, the plunger 436 was pulled to the right, as in Fig. 21 with the lower retainer pin 434 to the right and clear of the passage 448 and with the upper retainer pin 446 protruding into the passage 448.

The removal of the lower retainer pin 434 from the cylindrical passage 448 released the spring 35' that was lowest in the cylindrical passage 448. While the lower retainer pin 434 was receding from the cylindrical passage 448, the upper retainer pin 446 was protruding into the passage 448 into the middle of the spring 35'', which was the second lowest spring in the passage 448. The upper retainer pin 446 thus retained the spring 35'' and all of the springs 35—35 above it in the passage 448 and in the tubing 427, before the lowest spring 35' was released by the lower retainer pin 444.

At the start of the up stroke of the bearing block 467 the connection to the escapement solenoid 434 was broken and the solenoid 434 became unenergized. The springs 443—443 forced the framework 437 to the left. The lower retainer pin 434 protruded into the passage 448 before the upper retainer pin 446 was completely withdrawn from the passage 448 to release the spring 35''. When the upper retainer pin 446 receded from the passage 448, the spring 35'' dropped down against the lower retainer pin 444 into the position formerly occupied by the spring 35'. Meanwhile, the spring 35' dropped through the tubing 449, and through the spring-delivery tube 450 and the lower portion 454 of the cylindrical passage 452 in the spring-collector block 451, to the pin chamber 42 of the lock 29. Thus, the second down stroke of the bearing block 467 is made after the springs 35—35 have been supplied to the pin chambers 42—42.

On the second down stroke of the bearing block 467 the sensing rods 485—485 press the springs 35—35 down against the pins 34—34 in the pin chambers 42—42, assuring that the springs 35—35 are completely inside the pin chambers 42—42. At the bottom of the down stroke the actuating arm 481 contacts the turning pin 480 that points horizontally to the right, moving the switch-actuating member 478 forty-five degrees, and thereby moving the switch-actuating pin 479 that was pointing vertically upward, to a new position forty-five degrees to the left of the vertical. At the bottom of the down stroke of the bearing block 467 the left side 471 of the bearing block 467 presses the switch actuator arm 473 of the switch 475, closing the switch 475 and completing a connection from the secondary 526 of the transformer 525 through the contact arm 517, the contact point 520, and the switch 475 to the valve control solenoid 528. The solenoid 528 is energized, and moves the valve 463 to the position that causes the air motor 462 to move the bearing block 467 back up to its upper position as shown in Fig. 18.

After the turntable 55 moves another lock 29 into position under the spring-collector block 451, the switch 514 is closed again by the relay 280, and the entire operation is repeated.

*Operation where one pin is missing*

Assume that a pin is missing from the third pin chamber 42. The operation of the spring-supplying and loading unit 53 is the same as that described above, except that on the first down stroke the third sensing rod 485 moves farther down into the pin chamber 42 than the other four sensing rods 485 move, because it is not stopped by a pin. The bottom surface 493 of the third cylindrical member 487, to which the third sensing rod 485 is connected, presses down against the third switch 503 moving it to its lower position in contact with the contact point 573. This breaks the circuit to the escapement solenoid 434c, and thus prevents the release of a spring to the third pin chamber 42. A connection is made instead from the conductor 512 through the contact arm 531, the contact point 532, the contact arm 519, the contact point 522, the conductor 534, the switch arm 503, and the contact point 573, to the trouble-indicator light 543, and to the shutdown control solenoid 553. The relay 553 closes the switches 583a and 583b.

If it is desired to reject any lock in which a pin is missing, the shutdown control relay 553 can be employed in a conventional manner to close an additional switch to operate a mechanism that will eject the lock 29 into a container for rejected locks. If such an action is provided, the second down stroke of the bearing block 467 does not accomplish anything except complete the cycle so that the spring-supplying and inserting unit 53 is ready to operate properly when the next lock 29 is in position. If this action is not employed, the operation is the same as that described above except that the third pin chamber 42, which does not have any pin in it, does not receive any spring.

*Operation with more than one pin missing*

If pins are missing from two or more of the pin chambers 42—42, the operation of the spring-supplying and inserting unit 53 is similar to that described above. Assume that pins are missing from the second and third pin chambers 42—42. The operation is the same as that described in the two preceding paragraphs, except that both the switch arm 502 and the switch arm 503 are moved to their lower position at the bottom of the first down stroke of the bearing block 467. The switch arm 502 contacts the contact point 572, lighting the trouble-indicator light 542 and energizing the shutdown control relay 552. The switch arm 503 contacts the contact point 573, lighting the trouble-indicator light 543 and energizing the shutdown control relay 553. The shutdown control relay 552 closes the switches 582a, 582b, and 582c. The shutdown control relay 553 closes the switches 583a, 583b, and 583c. The closing of these switches completes a connection from the conductor 508 through the switch 583c, the conductor 538, the switch 582c, and the conductor 535, to the shutdown relay 511. (This connection is also completed through the switch 583b, the conductor 537, and the switch 582b.) The shutdown relay 511 is energized and opens the switches 510 and 281, thereby disconnecting all of the electrical components of the spring-supplying and inserting unit 53 and of the pin-loading and ramming units 51, 52 from the voltage source 506.

When two or more pins are missing from any lock 29, the pin-loading unit 51 should be checked, as trouble is indicated. Therefore, it is desirable to disconnect the voltage source from all of the equipment. When the trouble has been corrected the shutdown relay 511 can be reset by manually closing the ganged switches 510, 281. It is apparent from Fig. 24 that if pins are missing from any two of the pin chambers 42—42 at least one connection is completed from the conductor 508 to the conductor 535 to energize the shutdown relay 511 and open the switches 510, 281. If pins are missing from more than two of the pin chambers 42—42, additional connections are provided between the conductor 508 and the conductor 535. These additional connections do not have any effect, and are mentioned merely to show that the shutdown relay 511 is energized when pins are missing from any two or more of the pin chambers 42—42. If it is desired to operate the relay 511 when any one or more of the relays 551–555 are actuated, the switches 581a, 582a, 583a, 584a, 585a are merely connected in parallel between the conductor 508 and the conductor 535. If it is desired to operate the relay 511 only if a larger number of the relays 551–555 are actuated, such operation can be provided in other obvious ways.

*Summary of spring unit 53*

Summarizing, there has been disclosed apparatus 53 for supplying helical springs 35—35 to the pin chambers 42—42 of a pin-tumbler lock 29 Fig. 17. The apparatus 53 includes means 467, 485, 487, 488, 489 for determining whether a pin 34 is present in each pin chamber 42; including a rod 485 aligned with each pin chamber 42, and means 467 yieldably connected, 487, 488, 489, to each rod 485 to move the rod 485 at a selected time into its corresponding pin chamber 42 against the pin 34 if a pin 34 is present in the chamber 42, and to a greater depth if a pin 34 is not present in the chamber 42. Means 455, communicating with each pin chamber 42, feed helical springs 35—35 thereto singly. Means 428, 501-505, responsive to each determining means 467, 485, 487, 488, 489, for causing each feeding means 485 to feed one spring 35 to its associated pin chamber 42 when a pin 34 is present in the chamber 42, include switching means 501-505 for completing an electrical connection to actuate the feeding means 455 when a pin 34 is present in the chamber 42 and for opening the electrical connection when a pin 34 is not present in the chamber 42. Means 471, 473, 475, 528, 463, 462 withdraw the rods 485—485 from the pin chambers 42—42 before the springs 35—35 are fed to the pin chambers 42—42. Means 479, 483, 527, 463, 462, including the yieldably connected means 467, move the rods 485—485 into the pin chambers 42—42 again, after the springs 35—35 have been fed to the pin chambers 42—42, to press the springs 35—35 to positions completely within the pin chambers 42—42. Means 471, 473, 475, 528, 463, 462 withdraw the rods 485—485 again from the pin chambers 42—42. Means 501-505, 510, 511, 551-555, 581a-585b, responsive to the determining means 455, for interrupting the operation of the apparatus 53, and of associated apparatus 51, 52 for supplying the pins 34—34 to the pin chambers 42—42, when a pin 34 is missing from more than a predetermined number of pin chambers 42—42, include switching means 510 for opening electrical connections to all of the spring-feeding means 455—455, and for modifying an electrical connection in the associated apparatus 51, 52.

The apparatus 455 feeds singly to a predetermined receiving location 42 a plurality of substantially identical helical springs 35—35 that are greater in axial length than in diameter. The apparatus 455 includes a container 410 for the springs 35—35. The container 410 has a vertical cylindrical outlet 415 having a diameter greater than the diameter of the springs 35—35 and less than twice the spring diameter. A member 412 in the container 410 has a shallow conical funneling surface 414 located above the bottom surface 415 of the container 410, having a diameter greater than the length of the springs 35—35, and communicating with the outlet 415. Means 402—408 vibrate the container 410 substantially vertically so as to raise the springs 35—35 and cause some of them to fall on the shallow conical surface 414 and through the outlet 415. The vibrating means 402—408 includes a flat spring 408 connected to the container 410, and a cam 407 in contact with the flat spring 408. An inclined trough 417 is located with its upper portion below the outlet 415 in the container 410 to catch the springs 35—35 falling through the outlet 415. A guide channel 421 formed by the bottom surface in the trough 417 permits the springs 35—35 to slide down the trough 417 in a line along their axes. An impact plate 423 is provided in the trough 417 to break apart any tangled springs 35—35. At least one baffle 424 may be provided also in the trough 417 to direct the springs 35—35 along the guide channel 421. A cylindrical outlet 426, having a diameter greater than the diameter of the springs 35—35 and less than twice the spring diameter, is provided in the trough 417, in line with the guide channel 421 at the lower end of the trough 417. A hollow guide 427 communicating with the outlet 426 guides the springs 35—35 in line axially to an intermediate stopping location 428, 444 in the apparatus 425. An opening 429, provided in the lower end of the trough 417 adjacent to the outlet 426, is large enough to permit any of the springs 35—35 reaching the vicinity of the outlet 426, but failing to enter the outlet 426, to drop through the opening 429. A receptacle 430 located below the opening 429 receives and contains any of the springs 35—35 that drop through the opening 429. A release mechanism 428 is provided at the intermediate stopping location 428, 444 for releasing one spring 35 at a time. The release mechanism 428 includes a lower retainer 444 and an upper retainer 446 located above the lower retainer 444 a distance greater than the length of the springs 35—35 and less than twice the spring length. Means, 434—448, are provided for alternately releasing one retainer 444 (446) while moving the other retainer 446 (444) into its retaining position in such manner that when the lower retainer 444 is being released the upper retainer 446 is moved into its retaining position, retaining the spring 35″ then second lowest in the hollow guide 448, before the lower retainer 444 releases the spring 35′ then lowest in the hollow guide 448, and that when the upper retainer 446 is being released the lower retainer 444 is moved into its retaining position, to catch the spring 35″ then lowest in the hollow guide 448, before the upper retainer 446 releases the spring 35‴. A hollow guide continuation 449 communicating with the intermediate stopping point 428, 444 conducts each spring 35 released by the release mechanism 428 to the predetermined receiving location 42. Means 460 responsive to preselected conditions at the receiving location 42 control the operation of the release mechanism 428.

While the forms of the invention herein shown and described constitute preferred embodiments of the invention, it is not intended herein to illustrate all of the possible equivalent forms or ramifications of the invention. It will be understood that the words used are words of description rather than of limitation, and that various changes may be made without departing from the spirit or scope of the invention herein disclosed.

What is claimed is:

1. An orientator-dispenser mechanism for orienting pins with respect to the distinguishable ends thereof and for dispensing said pins singly, comprising frame means: inlet channel means supported by said frame means for conveying said pins in single file into a gaging aperture, said gaging aperture having means for positioning said pins longitudinally with respect to the distinguishable end thereof; slide means forming a side of said gaging aperture at a first position, in contact with said pins on one side and having a dispensing aperture therein removed from said gaging aperture at said first position; and means to move said slide means and said dispensing aperture to a second position with said dispensing aperture adjacent said pin in said gaging aperture, said dispensing aperture length and position being predetermined at said second position to allow said pins to rotate through said dispensing aperture in one direction or the other according to the longitudinal position of said pins in said gaging aperture.

2. Apparatus for simultaneously assembling pins in the all pin chambers of a pin-tumbler lock with said pins oriented with respect to the distinguishable ends thereof comprising apparatus according to claim 1 wherein there is provided: gate means slidably supported in said frame to support said pins above said chambers at stationary sensing positions; conveyance means for conveying said pins from said dispensing aperture to said sensing positions on said gate means; engagement means reciprocaly supported on said frame, and operable to project into said sensing positions and engage said pins if said pins are present, and to project further into said sensing positions if said pins are not present; electric motor means operable to move said gate means from beneath said pins and to simultaneously release said pins into said chambers; and switch means in the electrical connection to said electric motor means, engaged and opened by said engagement means during said further projection into said sensing position, to prevent operation of said electric motor means if said pins are not present.

3. Assembly apparatus according to claim 2 wherein said inlet channel means is connected to and fed by a pin storage and conveyer apparatus comprising: storage means for the random storage of said pins with respect to position; spiral-groove means in communication with the storage area of said storage means and forming a part of the outer wall of said storage means; and electrical coil means operable to move said storage means and said spiral-groove means in a vibratory-oscillatory motion to convey said pins in single file and axially aligned into said inlet channel means by progression through said spiral groove means.

4. Apparatus for assembling pins and springs in the pin chambers of pin-tumbler locks, said pins having distinguishable ends and divided along their length by a small neck portion, according to claim 2 wherein there is provided: ram means for striking each pin in a pin chamber with a blow to crush the neck thereof at the line of division; means for determining whether a pin is present in each said pin chamber; and means responsive to said determining means for feeding a spring to each said pin chamber having a pin therein.

5. Apparatus for assembling pins and springs in the pin chambers of pin-tumbler locks according to claim 2 wherein there is provided: ram means for striking said pins in said chambers a blow to crush the necks of said pins at the line of division thereof; means for determining whether a pin is present in each said pin chamber; means responsive to said determining means for feeding a spring to each said pin chamber that has a pin therein; and means for holding said lock and moving said lock in successive movements to positions beneath said sensing-gate means, said ram means, and said spring-feeding means.

6. An orientator-dispenser mechanism for orienting lock pins with respect to the distinguishable larger-diameter and smaller-diameter ends thereof and for dispensing said pins singly, comprising: frame means; inlet channel means supported on said frame means in an inclined position for conveying said pins in single file and axially aligned into a gaging aperture, said gaging aperture having means for positioning said pins longitudinally with respect to the larger and smaller ends thereof; slide means forming the bottom side of said gaging aperture at a first position, supporting said pins and having a dispensing aperture therein removed from said gaging aperture at said first position; and means to move said slide means and said dispensing aperture to a second position beneath said gaging aperture, said dispenser aperture length and position being predetermined at said second position to allow said pins to rotate in one direction or the other and pass down through said dispensing aperture, said direction of rotation of said pins being determined by the longitudinal position of said pins in said gaging aperture.

7. An orientator-dispenser mechanism for orienting elongated cylindrical lock pins with respect to the larger-diameter and smaller-diameter end portions thereof and for dispensing said pins singly, comprising: a frame; an inlet channel member supported on said frame in inclined position having a channel therein conforming to the cross-sectional form of said pins so that said pins are conveyed by gravity in said channel in single file and in axial alignment, said channel having a gaging aperture at the lower terminal end thereof, said gaging aperture being formed at the lower end to admit the smaller-diameter end of said pins but not the larger-diameter end of said pins so that said pins are positioned in said gaging aperture with respect to the distinguishable ends thereof; a slide member slidably supported beneath said inlet channel member and forming the bottom side of said gaging aperture upon which the pins rest at the first position of said slide member, said slide member having a dispensing aperture therein, said dispensing aperture being shorter than said pins but longer than the end of said pins having the larger diameter and at a position removed from said gaging aperture at said first position of said slide member; and means to resiliently urge and move said slide member from said first position to a second position with said dispensing aperture beneath and registered with said gaging aperture, said dispenser aperture length and position being predetermined for said second position so that said pins rotate by gravity in one direction to a position of larger-diameter end portion down first when the smaller-diameter end portion of said pin is restrained on the lower end of said dispensing aperture and to rotate in the other direction to a position of the larger-diameter end portion down first when the smaller-diameter pin end is restrained on the upper end of said dispensing aperture.

8. Apparatus for simultaneously assembling pins and sequentially thereafter assembling springs in the pin chambers of a pin-tumbler lock comprising: orientator-dispenser means to orient said pins with respect to the distinguishable ends thereof and to substantially simultaneously release one of said pins singly into each of the pin chambers of a pin-tumbler lock; means for simultaneously striking said pins in said pin chambers of the pin-tumbler lock a blow to crush the necks of said pins at the line of division thereof; means for determining whether a pin is present in each said pin chamber; and means, responsive to said determining means, for feeding a spring to each said pin chamber that has a pin therein.

9. Apparatus for supplying pins and springs to the pin chambers of a pin-tumbler lock, comprising: means for storing a plurality of pins having different division lengths in random storage with respect to position but segregated storage with respect to division lengths; means for conveying said pins in longitudinally disposed single-file relation; a plurality of orientator-dispenser means to receive said conveyed pins and to orient and dispense said pins singly upon an electric signal provided by the single-movement actuation of an operator; conduit means from said orientator-dispenser means to each pin chamber of a pin-tumbler lock body; means for determining whether a pin is present in each said pin chamber; and means, responsive to said determining means for feeding a spring to each said pin chamber that has a pin therein.

10. Apparatus for assembling pins and springs in the pin chambers of a pin-tumbler lock comprising: orientator-dispenser means to orient said pins with respect to the distinguishable ends thereof and to release said pins singly; sensing-gate means to receive pins from and to verify the operation of said orientator-dispenser means by sensing for the presence of a pin in a sensing position above by each of said pin chambers of said lock; means for releasing a pin into each chamber of said lock when a pin is present for each chamber; ram means for striking said pins in said chambers a blow to crush the necks of said pins at the line of division thereof; means for determining whether a pin is present in each said pin chamber; and means responsive to said determining means for feeding a spring to each said pin chamber having a pin therein.

11. Apparatus for assembling pins and springs in the pin chambers of a pin-tumbler lock according to claim 10 wherein means is provided for holding said lock and moving said lock in successive movements to stationary positions beneath said sensing-gate means, said ram means, and said spring-feeding means.

12. Apparatus for assembling pins and springs in the pin chambers of a pin-tumbler lock comprising: orientator-dispenser means to orient said pins with respect to the distinguishable ends thereof and to release said pins singly; sensing-gate means to receive pins from and to verify the operation of said orientator-dispenser means by sensing for the presence of a pin in a sensing position above each of said pin chambers of said lock; means for releasing a pin into each chamber of said lock when a pin is present for each chamber; ram means for striking said pins in said chambers with a blow to crush the necks of said pins at the line of division thereof; means for determining whether a pin is present in each said pin chamber; means communicating with each said pin chamber for feeding springs thereto singly; means, responsive to each said determining means, for causing said feeding means to feed one said spring to its associated pin chamber when a pin is present in said chamber; and means, responsive to said determining means, for interrupting the operation of said apparatus when a pin is missing from more than a predetermined number of pin chambers.

13. Apparatus for assembling pins and springs in the pin chambers of pin-tumbler locks according to claim 12 wherein means is provided for holding said lock and moving said lock in successive movements to stationary positions beneath said sensing-gate means, said ram means, and said spring-feeding means.

14. Apparatus for assembling pins and springs in the pin chambers of a pin-tumbler lock comprising: storage means for the random storage of said pins with respect to position; spiral-groove means in communication with the storage area of said storage means; coil means operable to move said storage means and said spiral-groove means in a vibratory-oscillatory motion to convey said objects in single file and axially aligned; orientator-dispenser means to receive said pins from said storage means and to orient said pins with respect to the distinguishable ends thereof and to release said pins singly; sensing-gate means to receive pins from and to verify the operation of said orientator-dispenser means by sensing for the presence of a pin in a sensing position above each of said pin chambers; means for releasing a pin into each chamber of said lock when a pin is present for each chamber; ram means for striking said pins in said chambers a blow to crush the necks of said pins at the line of division thereof; means for determining whether a pin is present in each said pin chamber and means responsive to said determining means for feeding a spring to each pin chamber that has a pin therein; and means for holding said lock and moving said lock in successive movements to positions beneath said sensing-gate means, said ram means, and said spring-feeding means.

15. Apparatus for assembling pins in the pin chambers of pin-tumbler locks with said pins oriented with respect to the distinguishable ends thereof and inserted in said chambers in a controlled permutation of the possible combination of pin division lengths with respect to chamber position in said lock comprising: storage means for the random storage of said pins with respect to position and the segregated storage of said pins with respect to pin division length; spiral-groove conveyor means in communication with the storage area of said storage means; coil means operable to move said storage means and said spiral-groove means in a vibratory-oscillatory motion to convey said pins in single file and axially aligned; orientator-dispenser means to orient said pins with respect to the distinguishable ends thereof and to release said pins singly and selectively with respect to the division lengths thereof upon a control signal; sensing-gate means to receive pins from and to verify the operation of said orientator-dispenser means; means for releasing a pin into each chamber of said lock when a pin is present in said sensing-gate means for each chamber; ram means for striking said pins in said chambers a blow to crush the necks of said pins at the line of division thereof; means for determining whether a pin is present in each said pin chamber; means responsive to said determining means for feeding a spring to each said chamber that has a pin therein; means for holding said lock and moving said lock in successive movements to positions beneath said sensing-gate means, said ram means, and said spring-feeding means; and control means to control said orientator-dispenser means, said sensing-gate means, said ram means, and said spring-feeding means on the single movement of actuation by an operator to provide a predetermined permutation of said pin division lengths with respect to said pin chambers in each chamber to crush the neck of each pin in each chamber, and to insert a spring in each chamber.

16. Apparatus for supplying helical springs to the pin chambers of a pin-tumbler lock, comprising: means for determining whether a pin is present in each said pin chamber, comprising a rod aligned with each said pin chamber, and means yieldably connected to each said rod to move said rod at a selected time into its corresponding pin chamber, against the pin if a pin is present in said chamber, and to a greater depth if a pin is not present in said chamber; means communicating with each said pin chamber for feeding helical springs thereto singly; means, responsive to each said determining means, for causing said feeding means to feed one said spring to its associated pin chamber when a pin is present in said chamber, comprising switching means for completing an electrical connection to actuate said feeding means when a pin is present in said chamber and for opening said electrical connection when a pin is not present in said chamber; means for withdrawing said rods from said pin chambers before said springs are fed to said pin chambers; means, including said yieldably connected means, for moving said rods into said pin chambers again, after said springs have been fed to said pin chambers, to press said springs to positions completely within said pin chambers; and means for withdrawing said rods again from said pin chambers.

17. Apparatus for supplying helical springs to the pin chambers of a pin-tumbler lock, comprising: means for determining whether a pin is present in each said pin chamber, comprising a rod aligned with each said pin chamber, and means yieldably connected to each said rod to move said rod at a selected time into its corresponding pin chamber, against the pin if a pin is present in said chamber, and to a greater depth if a pin is not present in said chamber; means communicating with each said pin chamber for feeding helical springs thereto singly; means, responsive to each said determining means, for causing said feeding means to feed one said spring to its associated pin chamber when a pin is present in said chamber, comprising switching means for completing an electrical connection to actuate said feeding means when a pin is present in said chamber and for opening said electrical connection when a pin is not present in said chamber; means for withdrawing said rods from said pin chambers before said springs are fed to said pin chambers; means, including said yieldably connected means, for moving said rods into said pin chambers again, after said springs have been fed to said pin chambers, to press said springs to positions completely within said pin chambers; means for withdrawing said rods again from said pin chambers; and means, responsive to said determining means, for interrupting the operation of said apparatus, and of associated apparatus for supplying said pins to said pin chambers, when a pin is missing from more than a predetermined number of pin chambers, comprising switching means for opening said electrical connections to all said feeding means, and for modifying an electrical connection in said associated apparatus.

18. Apparatus for feeding singly to a predetermined receiving location a plurality of substantially identical helical springs that are greater in axial length than in diameter, comprising: a container for said springs; an outlet in said container; a member in said container having a shallow conical funneling surface communicating with said outlet; means for vibrating said container; an inclined trough located with its upper portion below said outlet in said container to catch the springs falling through said outlet; an outlet in said trough; a hollow guide communicating with said outlet for guiding said springs in line axially to an intermediate stopping location in said apparatus; and a release mechanism at said intermediate stopping location for releasing one said spring at a time.

19. Apparatus for feeding singly to a predetermined receiving location a plurality of substantially identical helical springs that are greater in axial length than in diameter, comprising: a container for said springs; a cylindrical vertical outlet in said container, having a diameter greater than the diameter of said springs and less than twice said spring diameter; a member in said container having a shallow conical funneling surface located above the bottom surface of said container, having a diameter greater than the length of said springs and communicating with said outlet; means for vibrating said container substantially vertically so as to raise said springs and cause some of said springs to fall on said shallow conical surface and through said outlet, comprising a flat spring connected to said container and a cam in contact with said flat spring; an inclined trough located with its upper portion below said outlet in said container to catch the springs falling through said outlet; a guide channel formed by the bottom surface in said trough for permitting said springs to slide down said trough in a line along their axes; an impact plate in said trough for breaking apart any tangled springs; a cylindrical outlet in said trough in line with said guide channel at the lower end of said trough, having a diameter greater than the diameter of said springs and less than twice said spring diameter; a hollow guide communicating with said outlet for guiding said springs in line axially to an intermediate stopping location in said apparatus; an opening in the lower end of said trough adjacent to said outlet, large enough to permit any said springs reaching the vicinity of said outlet but failing to enter said outlet to drop through said opening; a receptacle located below said last-mentioned opening for receiving and containing any said springs dropping through said last-mentioned opening; a release mechanism at said intermediate stopping location for releasing one said spring at a time comprising a lower retainer and an upper retainer located above said lower retainer a distance greater than the length of said springs and less than twice said spring length, and means for alternately releasing one said retainer while moving the other said retainer into its retaining position in such manner that when said lower retainer is being released said upper retainer is moved into retaining position, retaining the spring then second lowest in said hollow guide, before said lower retainer releases the spring then lowest in said hollow guide, and that when said upper retainer is being released said lower retainer is moved into its retaining position, to catch the spring then lowest in said hollow guide, before said upper retainer releases said spring; a hollow guide continuation communicating with said intermediate stopping point for conducting each spring released by said release mechanism to said predetermined receiving location; means responsive to preselected conditions at said receiving location for controlling the operation of said release mechanism.

20. Apparatus for simultaneously assembling a plurality of pins and sequentially thereafter assembling a plurality of springs in the chambers of a pin-tumbler lock, comprising an orientator-dispenser mechanism for orienting pins with respect to the distinguishable ends thereof and for dispensing said pins singly for each chamber of said lock, including inlet channel means for conveying said pins in single file into a gaging aperture, said gaging aperture having means for positioning said pins longitudinally with respect to the distinguishable ends thereof; slide means forming a side of said gaging aperture at a first position supporting said pins and having a dispensing aperture therein removed from said gaging aperture at said first position; and means to move said slide means and said dispensing aperture to a second position beneath said gaging aperture, said dispensing aperture length and position being predetermined at said second position to allow said pins to rotate through said dispensing aperture according to the longitudinal position of said pins in said gaging aperture; and conduit means to convey said oriented pins to said pin chambers; ram means for simultaneously striking all pins in the pin chambers a blow to crush the necks thereof at the line of division; means for determining whether a pin is present in each pin chamber; means communicating with each said pin chamber for feeding springs thereto singly; means responsive to each said determining means, for causing said spring-feeding means to feed one said spring to its associated pin chamber when a pin is present in said chamber; and means responsive to said determining means for interrupting the operation of said apparatus when a pin is missing from more than a predetermined number of pin chambers.

21. Apparatus for assembling pins in the pin chambers of pin-tumbler locks and orienting said pins with respect to the larger-diameter and smaller-diameter end portions thereof and to verify the presence of one pin for each chamber of the pin-tumbler lock, prior to the assembly of said pins in said pin chambers, comprising: a frame, a plurality of inlet channel members supported on said frame and in inclined position having the channels therein conforming to the cross-sectional form of said pins so that said pins are conveyed by gravity in each channel in single file and in axial alignment, each channel having a gaging aperture at the lower terminal thereof, said gaging aperture being formed at the lower end to admit the smaller-diameter end portion of said pins but not the larger-diameter end portion of said pins so that said pins are positioned in said engaging aperture with respect to the distinguishable ends thereof; a slide member slidably supported below each inlet channel member and forming the bottom side of said gaging aperture upon which the pins rest at the first position of said slide member, said slide member having a dispensing aperture therein shorter than said pins but longer than the end portion of said pins having the larger diameter, said dispensing aperture being at a position removed from said gaging aperture at said first position of said slide member; means to resiliently urge and move said slide member from said first position to a second position with said dispensing aperture beneath and registered with said gaging aperture, said dispensing aperture length and position being predetermined for said second position so that said pins rotate by gravity in one direction to a position of larger-diameter end portion down first, when the smaller-diameter end portion of said pin is restrained on the lower end of said dispensing aperture, and to rotate in the other direction to a position of the larger-diameter end portion down first, when the smaller-diameter end portion is restrained on the upper end of said dispensing aperture; a plurality of discrete congeneric inclined passages from an entrance position at each channel member to a sensing position at the bottom of said frame member, below said entrance position, and registered with said chambers; a plurality of sensing finger members individually reciprocal in said frame and having one end thereof movable from a position removed from said chamber to a position within said chamber; a plurality of rod members individually rigidly fastened to one of said finger members and reciprocal in said frame member to a position of contact with one of a plurality of electrical switches, when said finger end reciprocates to said position within said chamber; a first electric solenoid operable to reciprocate said rod and finger members; a second electric solenoid operable to move said gate member; and resilient means interposed between said first electric solenoid and said rod members whereby said sensing gate is rendered inoperable by the opening of whichever of said switch members is contacted by a rod member.

References Cited in the file of this patent

UNITED STATES PATENTS

| | | |
|---|---|---|
| 1,184,528 | Henderson | May 23, 1916 |
| 1,302,280 | Batchelder | Apr. 29, 1919 |
| 1,425,441 | Bickley | Aug. 8, 1922 |
| 1,679,759 | Best | Aug. 7, 1928 |
| 2,559,369 | Phillips | July 3, 1951 |
| 2,662,626 | Graham | Dec. 15, 1953 |
| 2,674,755 | Schlicksupp | Apr. 13, 1954 |
| 2,769,228 | Burge | Nov. 6, 1956 |

UNITED STATES PATENT OFFICE

CERTIFICATE OF CORRECTION

Patent No. 2,944,333 — July 12, 1960

Gerald A. Francis et al.

It is hereby certified that error appears in the printed specification of the above numbered patent requiring correction and that the said Letters Patent should read as corrected below.

Column 19, line 5, for "321" read -- 421 --; column 20, line 16, for "454" read -- 443 --; column 30, line 10, for "comprising frame means;" read -- comprising: frame means --; column 31, line 64, for "therefater" read -- thereafter --; column 33, line 10, for "each pin" read -- each said pin --.

Signed and sealed this 13th day of December 1960.

(SEAL)
Attest:
KARL H. AXLINE
Attesting Officer

ROBERT C. WATSON
Commissioner of Patents